(12) United States Patent
Kono et al.

(10) Patent No.: US 11,309,787 B2
(45) Date of Patent: Apr. 19, 2022

(54) POWER CONVERSION DEVICE

(71) Applicant: Mitsubishi Electric Corporation, Tokyo (JP)

(72) Inventors: Yoshiyuki Kono, Tokyo (JP); Shuhei Fujiwara, Tokyo (JP); Ryosuke Uda, Tokyo (JP); Shigeo Hayashi, Tokyo (JP)

(73) Assignee: MITSUBISHII ELECTRIC CORPORATION, Tokyo (JP)

( * ) Notice: Subject to any disclaimer, the term of this patent is extended or adjusted under 35 U.S.C. 154(b) by 231 days.

(21) Appl. No.: 16/635,297

(22) PCT Filed: Jun. 5, 2018

(86) PCT No.: PCT/JP2018/021612
§ 371 (c)(1),
(2) Date: Jan. 30, 2020

(87) PCT Pub. No.: WO2019/064705
PCT Pub. Date: Apr. 4, 2019

(65) Prior Publication Data
US 2021/0091661 A1    Mar. 25, 2021

(30) Foreign Application Priority Data

Sep. 26, 2017   (JP) .............................. JP2017-184986

(51) Int. Cl.
*H02M 1/32*     (2007.01)
*H02M 5/458*    (2006.01)
*H02M 7/483*    (2007.01)

(52) U.S. Cl.
CPC ........... *H02M 1/32* (2013.01); *H02M 5/4585* (2013.01); *H02M 7/483* (2013.01)

(58) Field of Classification Search
CPC ...... H02M 1/32; H02M 5/4585; H02M 7/483; H02M 7/4835; H02M 1/325; H02J 3/36; Y02E 60/60
(Continued)

(56) References Cited

U.S. PATENT DOCUMENTS

2010/0066174 A1    3/2010  Dommaschk et al.
2012/0217809 A1*   8/2012  Sato ..................... H02J 9/062
                                                     307/64
(Continued)

FOREIGN PATENT DOCUMENTS

JP      5318774 B2     10/2013
WO      2014095168 A1  6/2014

OTHER PUBLICATIONS

Received STIC search report from EIC 2800 searcher Salim Alam for claim 1 dated Mar. 24, 2021. (Year: 2021).*

(Continued)

*Primary Examiner* — Emily P Pham
*Assistant Examiner* — Htet Z Kyaw
(74) *Attorney, Agent, or Firm* — Buchanan Ingersoll & Rooney PC

(57) ABSTRACT

A power conversion device includes a conversion circuit constituted of a plurality of arm circuits and a bypass circuit. The bypass circuit includes a full-wave rectification circuit, a positive-side connection arm, and a negative-side connection arm. The full-wave rectification circuit is connected between a plurality of AC connections, a positive-side intermediate node, and a negative-side intermediate node, and configured to convert AC voltages generated at the plurality of AC connections into a DC voltage across the positive-side intermediate node and the negative-side intermediate node and output the DC voltage. The positive-side connection arm blocks a current in a direction from a (Continued)

positive-side DC terminal toward the positive-side intermediate node. The negative-side connection arm is connected between the negative-side intermediate node and a negative-side DC terminal and blocks a current in a direction from the negative-side intermediate node toward a negative-side DC terminal.

20 Claims, 23 Drawing Sheets

(58) Field of Classification Search
USPC .......................................................... 363/84
See application file for complete search history.

(56) References Cited

U.S. PATENT DOCUMENTS

| 2013/0148392 | A1* | 6/2013 | Inoue | H02M 7/10 |
| | | | | 363/68 |
| 2015/0349520 | A1* | 12/2015 | Davidson | H02M 7/483 |
| | | | | 361/57 |
| 2015/0357905 | A1* | 12/2015 | Nami | H02M 1/32 |
| | | | | 363/53 |
| 2016/0036314 | A1* | 2/2016 | Koyanagi | H02M 1/00 |
| | | | | 363/65 |

OTHER PUBLICATIONS

Received STIC search report from EIC 2800 searcher Salim Alam for claim 19 dated Mar. 23, 2021. (Year: 2021).*
International Search Report (PCT/ISA/210) dated Jul. 24, 2018, by the Japan Patent Office as the International Searching Authority for International Application No. PCT/JP2018/021612.

* cited by examiner

FIG.2
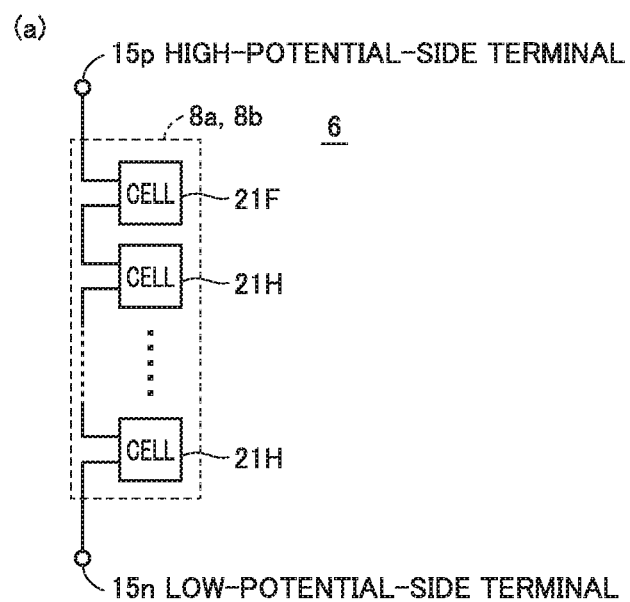
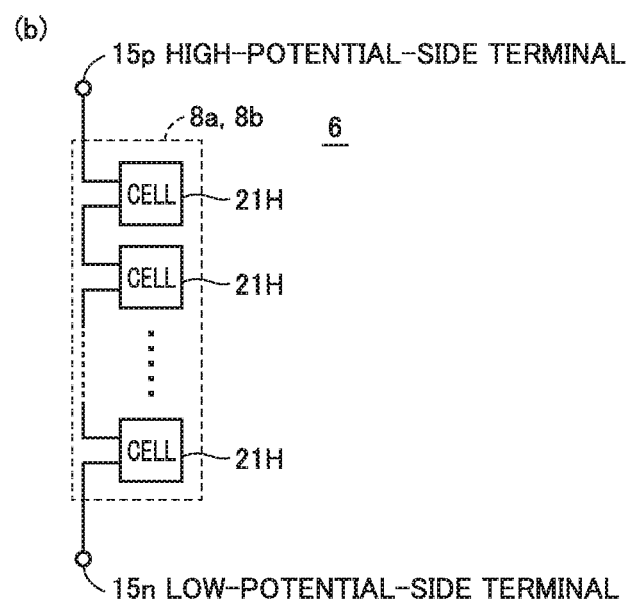

FIG.5
(a)
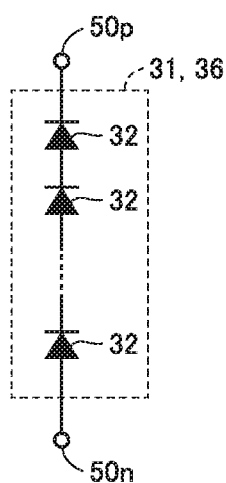
(b)
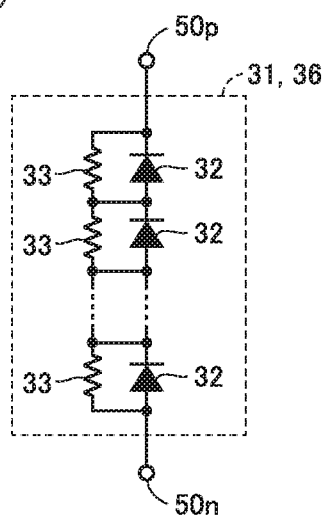

FIG.14
(a)
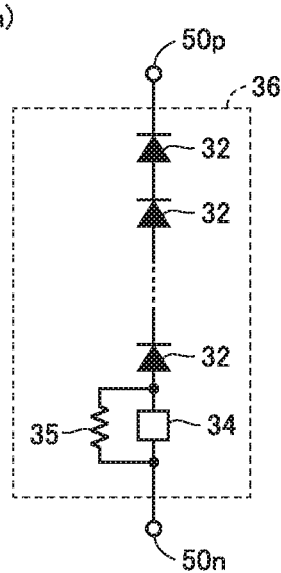
(b)
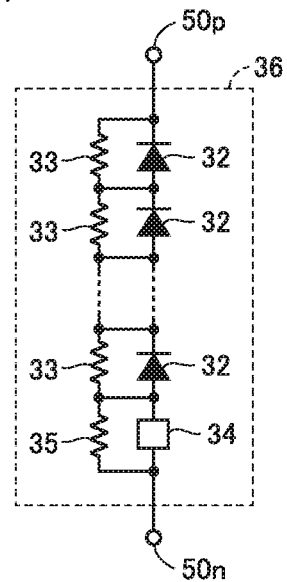

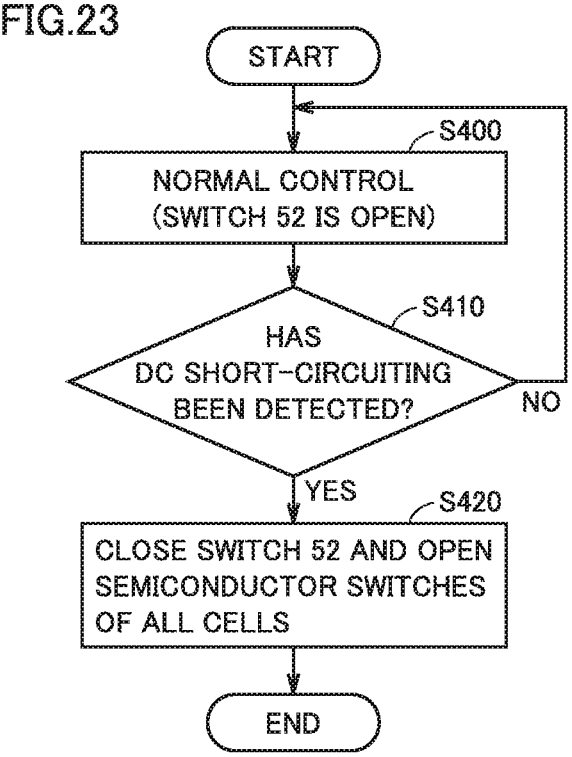

POWER CONVERSION DEVICE

TECHNICAL FIELD

This disclosure relates to a power conversion device which converts power between an alternating-current (AC) circuit and a direct-current (DC) circuit and is suitably used for what is called a modular multilevel converter.

BACKGROUND ART

A modular multilevel converter (MMC) is configured by multiplexing a plurality of converter cells in series for use in a high-voltage and high-current power system. More specifically, the modular multilevel converter includes for each AC phase, a first arm (arm) circuit connected to a positive-electrode-side DC terminal and a second arm circuit connected to a negative-electrode-side DC terminal. Each arm circuit includes a plurality of cascaded converter cells (which are also referred to as chopper circuits). An AC voltage of a corresponding phase is applied to a portion of connection between the first arm circuit and the second arm circuit of each phase.

Each converter cell includes a capacitor as an energy storage and a plurality of switching elements for outputting a zero voltage or a capacitor voltage across output terminals. Each converter cell is of a full-bridge or half-bridge circuit configuration.

One of problems in a modular multilevel converter is a flow of a DC short-circuiting current through each converter cell when a short-circuiting failure occurs in a DC circuit.

For example, when a short-circuiting failure occurs in a DC circuit in an example where each converter cell is of a half-bridge configuration, switching elements constituting each converter cell are all controlled to open. Since a DC short-circuiting current flows to a freewheel diode connected in parallel to the switching elements, the freewheel diode may thermally fail.

It is assumed that a short-circuiting failure occurs in a DC circuit in an example where each arm circuit is constituted of a small number of full-bridge converter cells and a large number of half-bridge converter cells as being mixed. In this case, when switching elements constituting each converter cell are all controlled to open similarly to the above, a capacitor in the full-bridge converter cell may break due to overvoltage.

As protective measures against thermal failure of a freewheel diode as above, Japanese Patent No. 5318774 (PTL 1) discloses a protective element provided in parallel to a freewheel diode through which a short-circuiting current is expected to flow. A diode or a thyristor is employed as a protective element in this case.

WO2014/095168 (PTL 2) discloses a protection device provided in parallel to a plurality of converter cells as a whole connected in series. For a protection device in this case, a plurality of diodes connected in series, a plurality of thyristors connected in series, or a plurality of diodes connected in series and a thyristor connected in series further thereto as being combined are employed.

CITATION LIST

Patent Literature

PTL 1: Japanese Patent No. 5318774
PTL 2: WO2014/095168

SUMMARY OF INVENTION

Technical Problem

Since at least one protective element described in Japanese Patent No. 5318774 (PTL 1) is necessary for each converter cell, many semiconductor elements as protective elements should be provided in a modular multilevel converter as a whole. When a thyristor is employed as a protective element for suppressing switching loss, an expensive thyristor should be provided for each converter cell and also an ignition circuit should be provided for each converter cell.

In WO2014/095168 (PTL 2), a withstand voltage of the protection device should be equal to or higher than a withstand voltage of converter cells connected in series which are to be protected. Therefore, many semiconductor elements such as diodes and thyristors should be provided in the protection device.

This disclosure addresses the problems above, and one of objects thereof is to provide a power conversion device capable of protecting each converter cell at the time of short-circuiting of a DC circuit by using a protective circuit constituted of a smaller number of semiconductor elements. Other tasks and novel features will be shown in the description herein and the attached drawings.

Solution to Problem

In one embodiment, a power conversion device to convert power between an AC circuit and a DC circuit is provided. The power conversion device includes a plurality of positive-side arm circuits, a plurality of negative-side arm circuits, and a bypass circuit. The plurality of positive-side arm circuits are connected between a plurality of AC connections connected to the AC circuit and a positive-side DC terminal connected to the DC circuit. The plurality of negative-side arm circuits are connected between the plurality of AC connections and a negative-side DC terminal connected to the DC circuit. Each of the positive-side arm circuits and each of the negative-side arm circuits each include a plurality of converter cells connected in series. Each of the converter cells includes an energy storage and a bridge circuit to switch connection between the energy storage and the outside. The bypass circuit includes a full-wave rectification circuit, a positive-side connection arm, and a negative-side connection arm. The full-wave rectification circuit is connected between the plurality of AC connections, a positive-side intermediate node, and a negative-side intermediate node to convert AC voltages generated at the plurality of AC connections into a DC voltage across the positive-side intermediate node and the negative-side intermediate node and output the DC voltage. The positive-side connection arm is connected between the positive-side intermediate node and the positive-side DC terminal and blocks a current in a direction from the positive-side DC terminal toward the positive-side intermediate node. The negative-side connection arm is connected between the negative-side intermediate node and the negative-side DC terminal and blocks a current in a direction from the negative-side intermediate node toward the negative-side DC terminal.

Advantageous Effects of Invention

According to the power conversion device in the embodiment, the number of semiconductor elements necessary for a bypass circuit can be reduced by implementing a bypass circuit to serve as a protective circuit by using a full-wave rectification circuit, a positive-side connection arm, and a negative-side connection arm.

BRIEF DESCRIPTION OF DRAWINGS

FIG. 2 is a circuit diagram showing an exemplary configuration of each arm circuit in FIG. 1 in the first embodiment.

FIG. 5 is a circuit diagram showing an exemplary configuration of an arm in the bypass circuit in FIG. 4.

FIG. 14 is a circuit diagram showing a modification of the connection arm in FIG. 12.

FIG. 23 is a flowchart showing an exemplary control operation by the power conversion device in FIG. 22.

DESCRIPTION OF EMBODIMENTS

Figure 1:
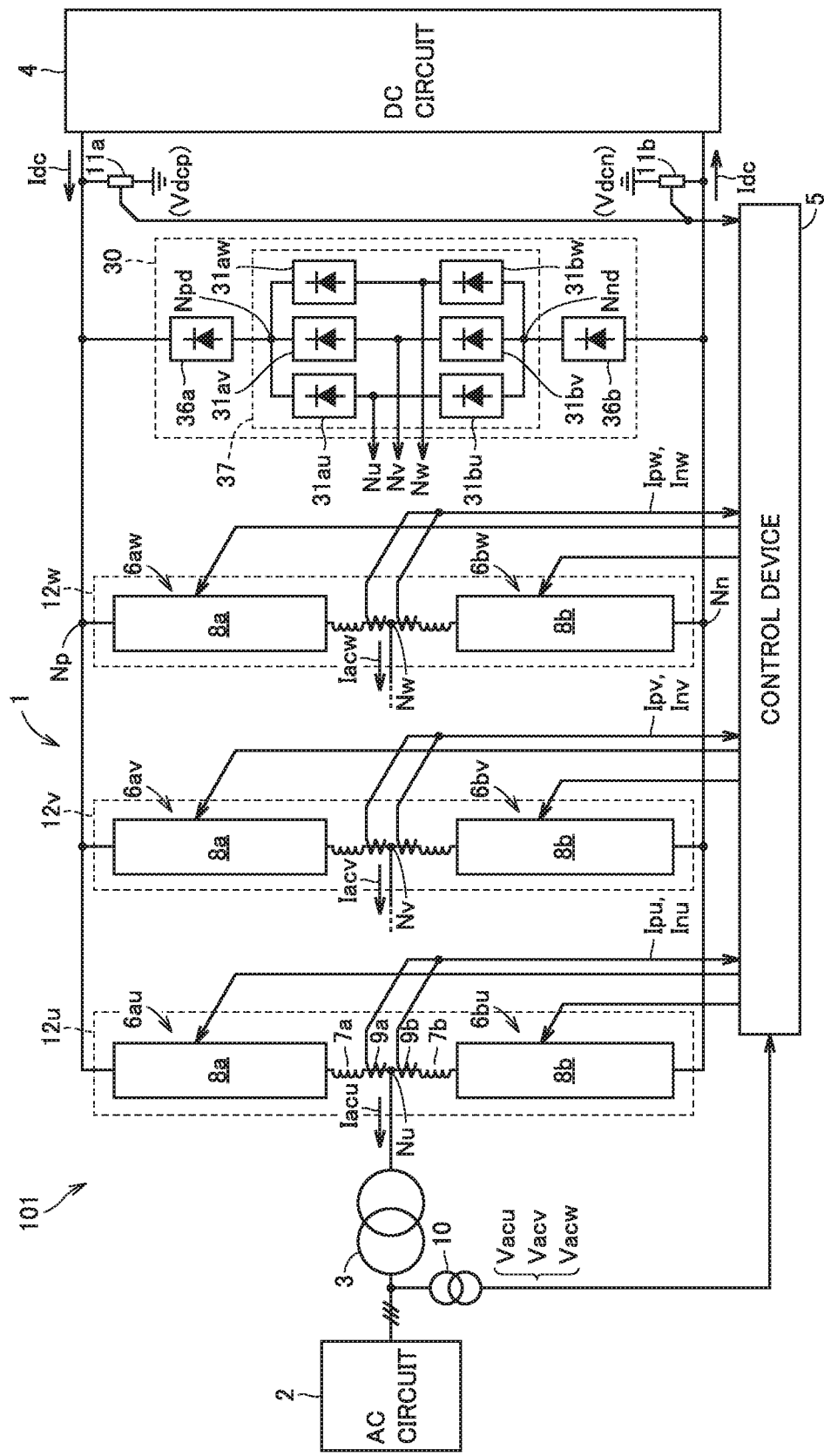
FIG. 1 is a schematic configuration diagram of a power conversion device according to a first embodiment.

Each embodiment will be described below in detail with reference to the drawings. The same or corresponding elements have the same reference characters allotted and description thereof will not be repeated.

First Embodiment

Schematic Configuration of Power Conversion Device

FIG. 1 is a schematic configuration diagram of a power conversion device according to a first embodiment. A power conversion device 101 is connected between an AC circuit 2 and a DC circuit 4 and converts power between these circuits. As shown in FIG. 1, power conversion device 101 includes leg circuits 12u, 12v, and 12w which are main circuits (which are denoted as a leg circuit 12 when they are collectively referred to or an unspecified one is referred to) and a control device 5 which controls these leg circuits 12. Control device 5 is implemented by a microcomputer including a microprocessor or a circuit configured with a field programmable gate array (FPGA) or an application specific integrated circuit (ASIC).

Leg circuit 12 is provided for each of phases implementing an alternating current. FIG. 1 shows a three-phase AC circuit 2, and three leg circuits 12u, 12v, and 12w corresponding to a u phase, a v phase, and a w phase, respectively, are provided. In this disclosure, leg circuits 12u, 12v, and 12w for the u phase, the v phase, and the w phase as a whole is referred to as a conversion circuit 1.

AC terminals Nu, Nv, and Nw provided in respective leg circuits 12u, 12v, and 12w as AC connections are connected to AC circuit 2 with an interconnected transformer 3 being interposed. AC circuit 2 is, for example, an AC power system including an AC power supply. For facilitating illustration, FIG. 1 does not show connection of AC terminals Nv and Nw to interconnected transformer 3.

A positive-side DC terminal Np and a negative-side DC terminal Nn provided in common to leg circuits 12 are connected to DC circuit 4. DC circuit 4 is, for example, a DC power system including a DC power grid and another power conversion device which provides a DC output. In a forward conversion operation (that is, conversion from AC to DC) under a normal condition, a DC current Idc flows in a direction from DC circuit 4 toward negative-side DC terminal Nn of power conversion device 101 and flows in a direction from positive-side DC terminal Np of power conversion device 101 toward DC circuit 4. In a reverse conversion operation (that is, conversion from DC to AC), a direction of flow is reverse to that.

In the present disclosure, a positive side means a high potential side and a negative side means a low potential side. The positive side may be described as a high side and the negative side may be described as a low side.

Instead of interconnected transformer 3 in FIG. 1, power conversion device 101 may be connected to AC circuit 2 with an interconnected reactor being interposed. Instead of AC terminals Nu, Nv, and Nw, a primary winding may be provided in each of leg circuits 12u, 12v, and 12w, and leg circuits 12u, 12v, and 12w may be connected in an AC manner to interconnected transformer 3 or an interconnected reactor with a secondary winding magnetically coupled to the primary winding being interposed. In this case, the primary winding may be implemented by reactors 7a and 7b. Each of leg circuits 12u, 12v, and 12w is electrically (in a DC or AC manner) connected to AC circuit 2 with a transformer provided in each of leg circuits 12u, 12v, and 12w being interposed, such as AC terminals Nu, Nv, and Nw or the above-described primary winding.

A detailed configuration of a transformer to connect AC circuit 2 and each of leg circuits 12u, 12v, and 12w as above will be described in detail with reference to FIG. 11. In this disclosure, AC terminals Nu, Nv, and Nw and the transformer may collectively be referred to as a connection.

A plurality of converter cells constituting leg circuit 12u of the u phase are divided into a positive-side arm circuit (which is also referred to as an upper arm circuit or a first arm circuit) Eau from positive-side DC terminal Np to AC terminal Nu and a negative-side arm circuit (which is also referred to as a lower arm circuit or a second arm circuit) 6bu from negative-side DC terminal Nn to AC terminal Nu. A point of connection between positive-side arm circuit 6au and negative-side arm circuit 6bu corresponds to AC terminal Nu. Similarly, leg circuit 12v of the v phase includes a positive-side arm circuit 6av and a negative-side arm circuit 6bv. Leg circuit 12w of the w phase includes a positive-side arm circuit 6aw and a negative-side arm circuit 6bw.

In the description below, denotation as a positive-side arm circuit 6a may be given when positive-side arm circuits of respective phases are collectively referred to or an unspecified one is referred to and denotation as a negative-side arm circuit 6b may be given when negative-side arm circuits of respective phases are collectively referred to or an unspecified one is referred to. Denotation as an arm circuit 6 may be given when positive-side and negative-side arm circuits of respective phases are collectively referred to or an unspecified one is referred to. A detailed configuration of each arm circuit 6 will be described with reference to FIG. 2.

Positive-side arm circuit 6a includes a cell group 8a including a plurality of cascaded converter cells (chopper cells) and reactor 7a. Cell group 8a and reactor 7a are connected in series to each other. For the sake of brevity, a converter cell (chopper cell) may be referred to as a cell below. A specific configuration of each converter cell will be described with reference to FIG. 3. Similarly, negative-side arm circuit 6b includes a cell group 8b including a plurality of cascaded converter cells and reactor 7b. Cell group 8b and reactor 7b are connected in series to each other.

In u-phase leg circuit 12u, reactor 7a may be interposed in any position in positive-side arm circuit 6a and reactor 7b may be interposed in any position in negative-side arm circuit 6b. For example, reactor 7a, 7b may be connected between a converter cell that constitutes arm circuit 6a and a converter cell that constitutes arm circuit 6b. A plurality of reactors 7a and a plurality of reactors 7b may be provided. The reactors may be different in inductance value. Only reactor 7a of positive-side arm circuit 6a or only reactor 7b of negative-side arm circuit 6b may be provided. This is also applicable to v-phase leg circuit 12v and w-phase leg circuit 12w.

The power conversion device in FIG. 1 further includes an AC voltage detector 10, DC voltage detectors 11a and 11b, and arm current detectors 9a and 9b provided in each leg circuit 12 as detectors which detect electric quantities (a current and a voltage) used for control. Signals detected by these detectors are input to control device 5. Furthermore, an AC current detector to detect an AC current that flows between AC circuit 2 and power conversion device 101 may be provided and a DC current detector to detect a DC current that flows between DC circuit 4 and power conversion device 101 may be provided.

Specifically, AC voltage detector 10 detects a u-phase voltage value Vacu, a v-phase voltage value Vacv, and a w-phase voltage value Vacw of AC circuit 2. DC voltage detector 11a detects a voltage of positive-side DC terminal Np connected to DC circuit 4. DC voltage detector 11b detects a voltage of negative-side DC terminal Nn connected to DC circuit 4. Arm current detectors 9a and 9b provided in leg circuit 12u for the u phase detect an arm current Ipu which flows in positive-side arm circuit 6a and an arm current Inu which flows in negative-side arm circuit 6b, respectively. Similarly, arm current detectors 9a and 9b provided in leg circuit 12v for the v phase detect a positive-side arm current Ipv and a negative-side arm current Inv, respectively. Arm current detectors 9a and 9b provided in leg circuit 12w for the w phase detect a positive-side arm current Ipw and a negative-side arm current Inw, respectively. Arm currents Ipu, Inu, Ipv, Inv, Ipw, and Inw which flow from positive-side DC terminal Np toward negative-side DC terminal Nn are defined as positive currents.

Configuration of Arm Circuit

FIG. 2 is a circuit diagram showing an exemplary configuration of each arm circuit in FIG. 1 in the first embodiment. FIG. 2 does not show reactor 7a or 7b in each arm circuit 6. In positive-side arm circuit 6a, a high-potential-side terminal 15p in FIG. 2 corresponds to positive-side DC terminal Np in FIG. 1 and a low-potential-side terminal 15n in FIG. 2 corresponds to AC terminal Nu, Nv, or Nw. In negative-side arm circuit 6b, high-potential-side terminal 15p in FIG. 2 corresponds to AC terminal Nu, Nv, or Nw in FIG. 1 and low-potential-side terminal 15n in FIG. 2 corresponds to negative-side DC terminal Nn.

Referring to FIG. 2, each arm circuit 6 includes m (m being an integer not smaller than 1) cascaded converter cells from a first cell 21F on a high potential side to an mth cell 21H on a low potential side.

Each arm circuit 6 shown in FIG. 2 (a) is characterized by including full-bridge converter cell 21F and half-bridge converter cell 21H as being mixed. Each arm circuit 6 includes at least one full-bridge converter cell 21F and at least one half-bridge converter cell 21H as converter cells 21. FIG. 2 shows an example in which each arm circuit 6 is constituted of one full-bridge converter cell 21F and a plurality of half-bridge converter cells 21H.

Each arm circuit 6 shown in FIG. 2 (b) is characterized by being constituted only of half-bridge converter cells 21H connected in series and not including full-bridge converter cell 21F.

Configuration of Converter Cell

Figure 3:
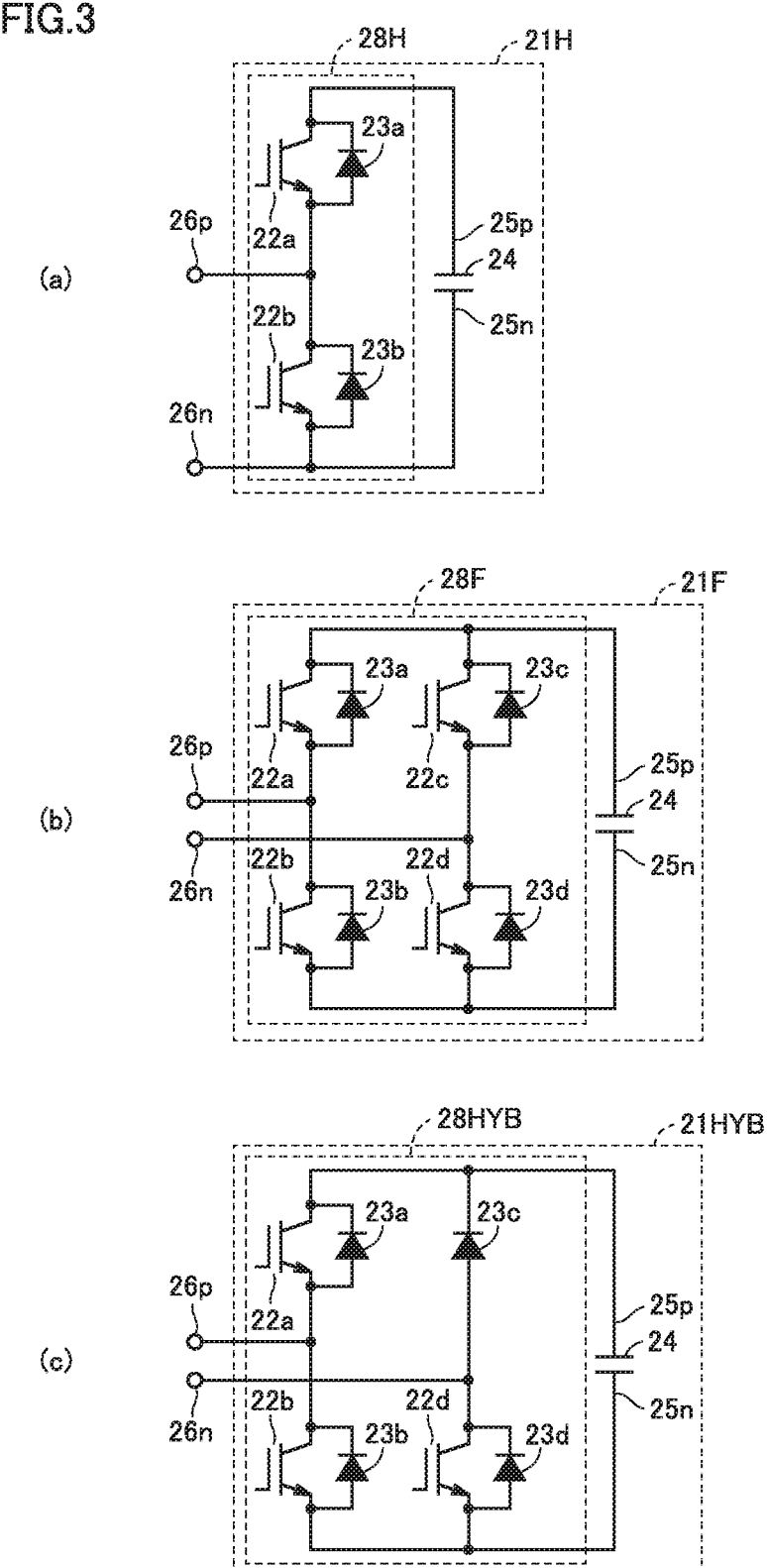
FIG. 3 is a circuit diagram showing an exemplary configuration of a converter cell included in each arm circuit in FIG. 2.

FIG. 3 is a circuit diagram showing an exemplary configuration of the converter cell included in each arm circuit in FIG. 2. FIG. 3 (a) shows a configuration of half-bridge converter cell 21H and FIG. 3 (b) shows a configuration of full-bridge converter cell 21F. FIG. 3 (c) shows one exemplary configuration of a hybrid converter cell 21HYB (which is also referred to as a hybrid bridge) which has functions of half-bridge converter cell 21H in FIG. 3 (a) and full-bridge converter cell 21F in FIG. 3 (b) as being combined. In the present embodiment, hybrid converter cell 21HYB can be employed instead of full-bridge converter cell 21F.

Referring to FIG. 3 (a), half-bridge converter cell 21H includes a bridge circuit 28H constituted of semiconductor switching elements 22a and 22b (which may hereinafter simply be referred to as a switching element) connected in series to each other and diodes 23a and 23b and a DC capacitor 24 as an energy storage. Diodes 23a and 23b are connected in anti-parallel (in parallel and in a direction of a reverse bias) to switching elements 22a and 22b, respectively. The diodes are connected such that cathodes of diodes 23a and 23b are on the high potential side and anodes of diodes 23a and 23b are on the low potential side. DC capacitor 24 is connected in parallel to a series connection circuit of switching elements 22a and 22b and smoothes a DC voltage. A connection node between switching elements 22a and 22b is connected to a positive-side input and output terminal 26p and a connection node between switching element 22b and DC capacitor 24 is connected to a negative-side input and output terminal 26n.

In half-bridge converter cell 21H, switching elements 22a and 22b are controlled such that one is turned on (closed) and the other is turned off (open). When switching element 22a is turned on and switching element 22b is turned off, a voltage across opposing ends of DC capacitor 24 is applied across input and output terminals 26p and 26n (a positive-side voltage being applied to input and output terminal 26p and a negative-side voltage being applied to input and output terminal 26n). In contrast, when switching element 22a is turned off and switching element 22b is turned on, 0 V is applied across input and output terminals 26p and 26n. Converter cell 21H shown in FIG. 3 (a) can output a zero voltage or a positive voltage (that is, a voltage dependent on a voltage of DC capacitor 24) by alternately turning on switching elements 22a and 22b. Diodes 23a and 23b are provided for securing a current path when voltages in reverse directions are applied to switching elements 22a and 22b.

Referring to FIG. 3 (b), bridge circuit 28F of full-bridge converter cell 21F is different from bridge circuit 28H of half-bridge converter cell 21H in FIG. 3 (a) in further including switching elements 22c and 22d connected in series and diodes 23c and 23d connected in anti-parallel to switching elements 22c and 22d. Switching elements 22c and 22d as a whole are connected in parallel to the series connection circuit of switching elements 22a and 22b and connected in parallel to DC capacitor 24. Input and output terminal 26p is connected to the connection node between switching elements 22a and 22b and input and output terminal 26n is connected to a connection node between switching elements 22c and 22d.

Full-bridge converter cell 21F is controlled such that switching element 22d is normally turned on, switching element 22c is normally turned off, and switching elements 22a and 22b are alternately turned on during a normal operation (that is, a zero voltage or a positive voltage is output across input and output terminals 26p and 26n).

Full-bridge converter cell 21F can also output a zero voltage or a negative voltage by normally turning off switching element 22a, normally turning on switching element 22b, and alternately turning on switching elements 22c and 22d.

Referring to FIG. 3 (c), bridge circuit 28HYB of hybrid converter cell 21HYB is configured with any one of switching elements 22a, 22b, 22c, and 22d having been removed from bridge circuit 28F of full-bridge converter cell 21F shown in FIG. 3 (b). FIG. 3 (c) shows a configuration with switching element 22c having been removed.

Hybrid converter cell 21HYB shown in FIG. 3 (c) is controlled to normally turn on switching element 22d and alternately turn on switching elements 22a and 22b during a normal operation (that is, a zero voltage or a positive voltage is output across input and output terminals 26p and 26n).

In a modification of the above in which switching element 22a is removed from FIG. 3 (b), a zero voltage or a negative voltage can be output under such control to normally turn on switching element 22b and alternately turn on switching elements 22c and 22d.

In a configuration in which switching element 22b is removed from FIG. 3 (b), a zero voltage or a positive voltage can be output under such control to normally turn on switching element 22a and alternately turn on switching elements 22c and 22d.

In a configuration in which switching element 22d is removed from FIG. 3 (b), a zero voltage or a negative voltage can be output under such control to normally turn on switching element 22c and alternately turn on switching elements 22a and 22b.

A self-turn-off switching element capable of control of both of an on operation and an off operation is employed for each of switching elements 22a, 22b, 22c, and 22d in FIG. 3. For example, an insulated gate bipolar transistor (IGBT) or a gate commutated turn-off thyristor (GCT) is employed as switching elements 22a, 22b, 22c, and 22d.

Configuration of Bypass Circuit

Figure 4:
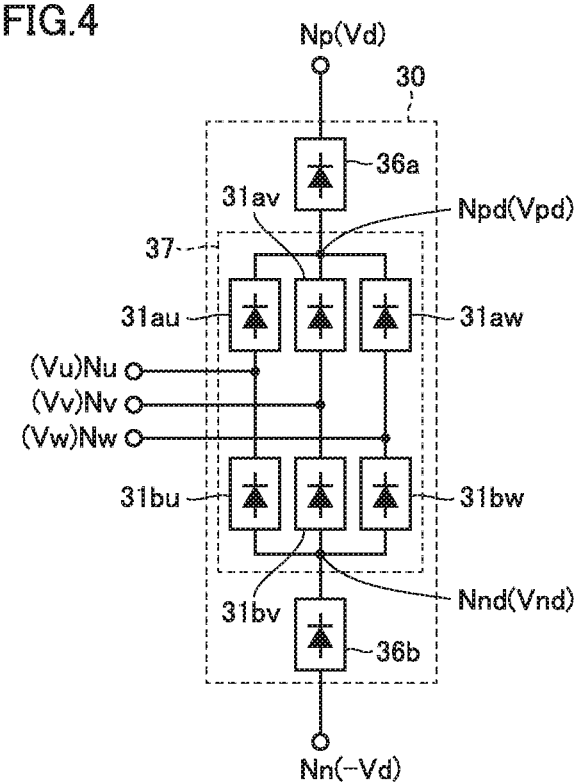
FIG. 4 is a circuit diagram showing an exemplary configuration of a bypass circuit in FIG. 1.

FIG. 4 is a circuit diagram showing an exemplary configuration of the bypass circuit in FIG. 1. A bypass circuit 30 includes a three-phase full-wave rectification circuit 37 and connection arms 36a and 36b to connect three-phase full-wave rectification circuit 37 to positive-side DC terminal Np and negative-side DC terminal Nn, respectively.

As shown in FIG. 4, three-phase full-wave rectification circuit 37 includes positive-side arms 31au, 31av, and 31aw connected between AC terminals Nu, Nv, and Nw and a positive-side intermediate node Npd and negative-side arms 31bu, 31bv, and 31bw connected between AC terminals Nu, Nv, and Nw and a negative-side intermediate node Nnd.

Positive-side arms 31au, 31av, and 31aw function as rectification elements to block a current in a direction from positive-side intermediate node Npd toward AC terminals Nu, Nv, and Nw. Negative-side arms 31bu, 31bv, and 31bw function as rectification elements to block a current in a direction from AC terminals Nu, Nv, and Nw toward negative-side intermediate node Nnd. Therefore, three-phase full-wave rectification circuit 37 is configured to convert AC voltages generated at AC terminals Nu, Nv, and Nw into a DC voltage across positive-side intermediate node Npd and negative-side intermediate node Nnd and output the DC voltage.

Positive-side connection arm 36a is connected between positive-side DC terminal Np and intermediate node Npd and functions as a rectification element to block a current in a direction from positive-side DC terminal Np toward intermediate node Npd. Similarly, negative-side connection arm 36b is connected between intermediate node Nnd and negative-side DC terminal Nn and functions as a rectification circuit to block a current in a direction from intermediate node Nnd toward negative-side DC terminal Nn.

In the description below, arms constituting three-phase full-wave rectification circuit 37 are collectively denoted as an arm 31, positive-side arms 31au, 31av, and 31aw are collectively denoted as a positive-side arm 31a, and negative-side arms 31bu, 31bv, and 31bw are collectively denoted as a negative-side arm 31b. Positive-side connection arm 36a and negative-side connection arm 36b are collectively denoted as a connection arm 36.

FIG. 5 is a circuit diagram showing an exemplary configuration of an arm in the bypass circuit in FIG. 4. In an example shown in FIG. 5 (a), arm 31 and connection arm 36 constituting three-phase full-wave rectification circuit 37 each include a plurality of diode elements 32 connected in series between a high-potential-side node 50p and a low-potential-side node 50n. A cathode of each diode element 32 is provided on the high potential side and an anode of each diode element 32 is provided on the low potential side.

In FIGS. 5 (a) and (b), for positive-side arms 31au, 31av, and 31aw, high-potential-side node 50p corresponds to intermediate node Npd and low-potential-side node 50n corresponds to AC terminals Nu, Nv, and Nw. For negative-side arms 31bu, 31bv, and 31bw, high-potential-side 50p corresponds to AC terminals Nu, Nv, and Nw and low-potential-side node 50n corresponds to intermediate node Nnd. For positive-side connection arm 36a, high-potential-side node 50p corresponds to positive-side DC terminal Np and low-potential-side node 50n corresponds to intermediate node Npd. For negative-side connection arm 36b, high-potential-side node 50p corresponds to intermediate node Nnd and low-potential-side node 50n corresponds to negative-side DC terminal Nn.

When diode elements 32 are varied in characteristics from one another in each of arms 31 and 36, voltages allocated to diode elements 32 are varied and hence diode element 32 to which a voltage higher than a voltage applied to other diode elements is applied may break due to overvoltage. In order to avoid this problem, an avalanche diode is desirably employed for each diode element 32. When a voltage equal to or higher than a defined level is applied across the anode and the cathode of the avalanche diode, a leakage current increases before it breaks. Increase in voltage in the avalanche diode itself can thus be suppressed and a voltage can be allocated to other diode elements 32.

FIG. 5 (b) shows a modification of FIG. 5 (a). The circuit in FIG. 5 (b) is different from the circuit in FIG. 5 (a) in including resistive elements 33 connected in parallel to respective diode elements 32. Resistive elements 33 have resistance values substantially equal to one another. A resistance value of resistive element 33 is set to a relatively high value such that substantially no current flows through each resistive element 33 in the direction from high potential side node 50p toward low potential side node 50n during a normal operation of the power system. By setting resistance values of resistive elements 33 substantially equal to one another, voltages allocated to diode elements 32 can substantially be equal so that diode element 32 can be prevented from breaking.

Operation by Bypass Circuit During Normal Operation

Figure 6:
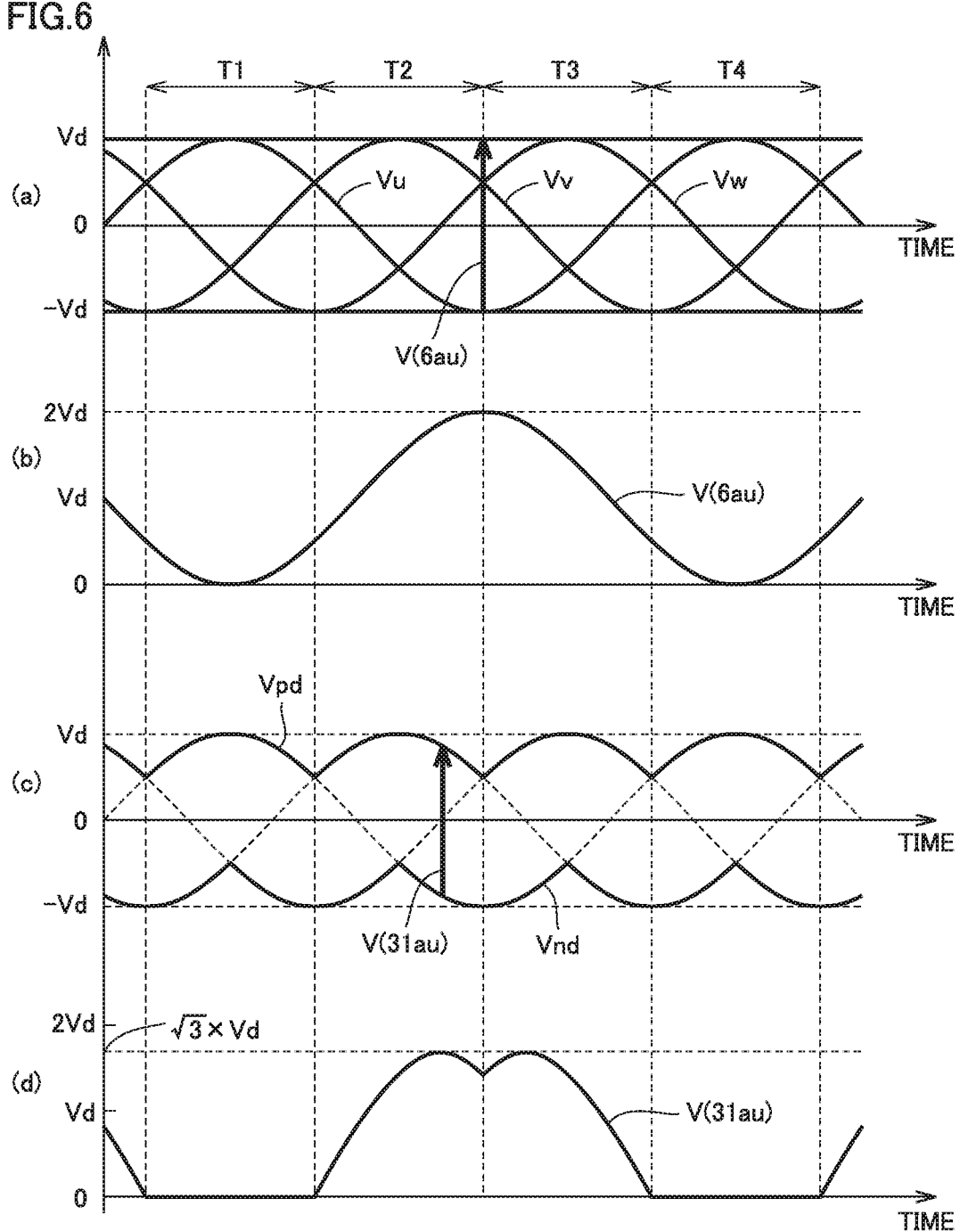
FIG. 6 is a diagram showing change over time in each terminal voltage and an arm voltage of a power conversion device during a normal operation.

FIG. 6 is a diagram schematically showing change over time in each terminal voltage and an arm voltage of a power conversion device during a normal operation. The abscissa in FIG. 6 (a) to (d) represents time (time). An operation by bypass circuit 30 shown in FIGS. 1 and 4 while power conversion device 101 performs forward conversion (that is, conversion from AC to DC) or reverse conversion (that is, conversion from DC to AC) (that is, during a normal operation) will be described below with reference to FIGS. 1, 4, and 6.

FIG. 6 (a) is a diagram showing change over time in potential at AC terminals Nu, Nv, and Nw and potential at DC terminals Np and Nn. As shown in FIG. 6 (a), the potential at positive-side DC terminal Np exhibits Vd which is a positive constant value and the potential at negative-side DC terminal Nn exhibits −Vd which is a negative constant value. Potentials Vu, Vv, and Vw at AC terminals Nu, Nv, and Nw are assumed as sinusoidal waves having a half amplitude (that is, from zero to peak) of Vd. This is a maximum AC voltage that can be generated by a converter and corresponds to an AC modulation factor of 100%. For example, when the potential at U-phase AC terminal Nu attains to a maximum value, output voltages from all converter cells constituting U-phase positive-side arm circuit 6a are equal to zero.

FIG. 6 (b) is a diagram showing change over time in voltage V (6au) applied to u-phase positive-side arm circuit 6au shown in FIG. 1. A differential voltage between potential Vd at positive-side DC terminal Np and potential Vu at U-phase AC terminal Nu is applied to u-phase positive-side arm circuit 6au. Therefore, magnitude of a maximum voltage thereof is 2×Vd and magnitude of a minimum voltage is 0. Similarly also in other arm circuits 6, magnitude of a maximum voltage is 2×Vd and magnitude of a minimum voltage is 0.

FIG. 6 (c) is a diagram showing change over time in potentials Vpd and Vnd at intermediate nodes Npd and Nnd of bypass circuit 30 (potentials Vpd and Vnd being shown with solid lines in the figure). In three-phase full-wave rectification circuit 37, potential Vpd at positive-side intermediate node Npd is equal to a maximum value of potentials Vu, Vv, and Vw at AC terminals Nu, Nv, and Nw. Specifically, in sections T1 and T4, potential Vpd at positive-side intermediate node Npd is equal to potential Vu at U-phase AC terminal Nu, in a section T2, potential Vpd at positive-side intermediate node Npd is equal to potential Vv at V-phase AC terminal Nv, and in a section T3, potential Vpd at positive-side intermediate node Npd is equal to potential Vw at W-phase AC terminal Nw. Similarly, potential Vnd at negative-side intermediate node Nnd is equal to a minimum value of potentials Vu, Vv, and Vw at AC terminals Nu, Nv, and Nw.

FIG. 6 (d) is a diagram showing change over time in voltage V (31au) applied to U-phase positive-side arm 31au constituting three-phase full-wave rectification circuit 37 shown in FIG. 4. A voltage generated in arm 31au is equal to a value calculated by subtracting potential Vu at U-phase AC terminal Nu from potential Vpd at positive-side intermediate node Npd. Specifically, a voltage generated in arm 31au in sections T1 and T4 is 0, and the voltage is varied such that the minimum value is 0 and the maximum value is (√3)×Vd in each of sections T2 and T3. (√3)×Vd is equal to an amplitude of a three-phase AC line voltage. In other arms 31 of three-phase full-wave rectification circuit 37 as well, the voltage is varied such that the minimum value is 0 and the maximum value is (√3)×Vd.

Decrease in Number of Elements Necessary for Bypass Circuit 30

Decrease in number of semiconductor elements (specifically, the number of diode elements connected in series) according to the configuration of bypass circuit 30 in the present embodiment as compared with the number in the protective circuit shown in PTLs 1 and 2 will be described based on the above. In the discussion below, the number of elements necessary for the bypass circuit or the protective circuit is approximately in proportion to an applied maximum voltage.

Specifically, a voltage of 2×Vd at the maximum is applied to each arm circuit 6 constituting conversion circuit 1. Therefore, when a protective circuit is provided for each converter cell or a cell block constituting each arm circuit 6 as shown in PTLs 1 and 2, 2×Vd×K diode elements are necessary for each arm for constituting a protective circuit.

K represents a proportionality constant. Therefore, conversion circuit 1 as a whole requires 12×Vd×K diode elements.

In bypass circuit 30 in the present embodiment, a voltage of (√3×Vd) at the maximum is applied to each arm 31 constituting three-phase full-wave rectification circuit 37. A voltage of (2−√3)×Vd at the maximum calculated by subtracting a voltage allocated to each arm 31 from 2×Vd representing a maximum voltage across AC terminals Nu, Nv, and Nw and DC terminals Np and Nn is applied to connection arms 36a and 36b. Therefore, bypass circuit 30 as a whole requires ((6×(√3)+2×(2−√3))×Vd×K=(4+4×√3)×Vd×K diode elements. Therefore, (8−4×√3)×Vd×K elements (approximately 8.9%) can be reduced as compared with the conventional technique.

When a full-bridge cell carries out auxiliary control (for example, circulating current control) other than power conversion, the full-bridge cell for auxiliary control generates a control voltage different from the AC voltage, as additionally being superimposed on the AC voltage. Therefore, a withstand voltage of the bypass circuit against a voltage resulting from addition of the control voltage to the AC voltage should be secured. A total of control voltages generated by full-bridge cells for auxiliary control included in each arm circuit 6 constituting conversion circuit 1 is assumed as Vf. Then, according to the conventional technique, a protective element such as a diode element that constitutes a protective circuit should be increased for each arm circuit 6 and 12×Vf×K protective elements should be added in the entire conversion circuit 1. For bypass circuit 30 in the present embodiment, 2×Vf×K protective elements should only be added to connection arms 36a and 36b and the number of additional protective elements provided in the bypass circuit in correspondence with an auxiliary control cell can be decreased.

Restriction of Amplitude of AC Voltage

Though an example in which an amplitude of voltages at AC terminals Nu, Nv, and Nw of power conversion device 101 is maximal (equal to Vd) is described with reference to FIG. 6, an amplitude of an AC voltage is desirably not controlled to a maximum value in the configuration of bypass circuit 30 described with reference to FIGS. 4 and 5. This is because, as shown in FIG. 6 (c), for example, when potential Vu at U-phase AC terminal Nu attains to a maximum value, potential Vpd at positive-side intermediate node Npd is equal to a potential (+Vd) at positive-side DC terminal Np and hence a current may flow between positive-side DC terminal Np and U-phase AC terminal Nu through positive-side connection arm 36a and U-phase positive-side arm 31au of bypass circuit 30. Similarly, for example, when potential Vu at U-phase AC terminal Nu attains to a minimum value, potential Vnd at intermediate node Nnd is equal to a potential (−Vd) at negative-side DC terminal Nn and hence a current may flow between negative-side DC terminal Nn and U-phase AC terminal Nu through negative-side connection arm 36b and U-phase negative-side arm 31bu of bypass circuit 30.

When a current thus flows through the bypass circuit, loss due to the bypass circuit is caused and restriction such as necessity for a cooling apparatus is imposed as a current conduction period is longer. When there is also a full-bridge cell and when half-bridge cells all apply a 0 voltage and the full-bridge cell applies a forward voltage to diodes in the bypass circuit, a high current may flow through the bypass circuit.

In order to block a current through bypass circuit 30 as above, in power conversion device 101 in the first embodiment, amplitudes of voltages at AC terminals Nu, Nv, and Nw are controlled not to attain to a maximum value, that is, an output voltage from at least one converter cell constituting each arm circuit 6 is controlled not to attain to zero. It is shown that, in a power conversion device in a second embodiment which will be described later, the restriction above can be eliminated by further providing a switching element 34 in connection arm 36 of bypass circuit 30.

Current Path When Short-Circuiting Failure Occurs in DC Circuit

A current path at the time when a short-circuiting failure occurs in the DC circuit will now be described in detail with reference to FIGS. 7 to 10.

Figure 7:
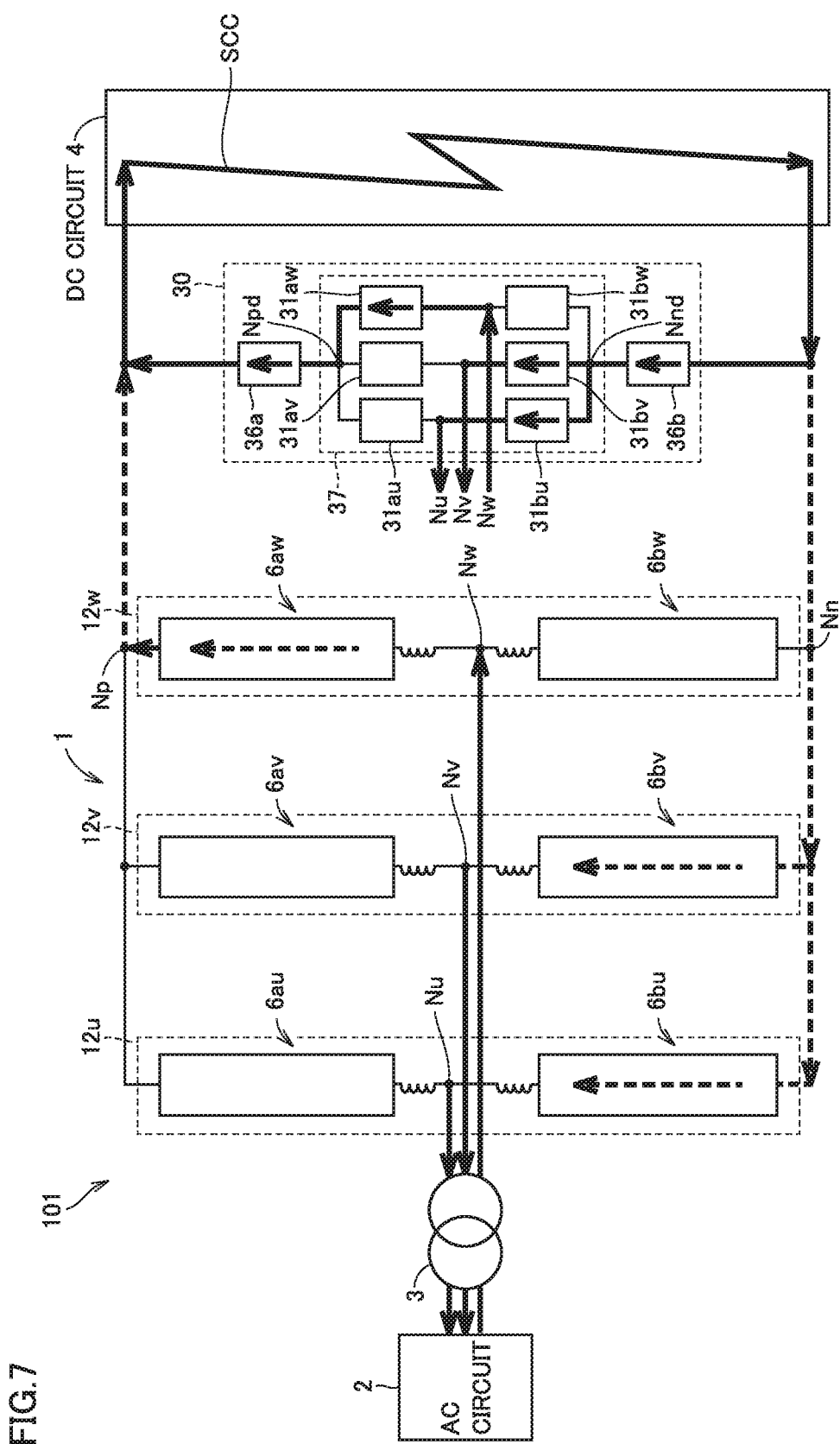
FIG. 7 is a diagram showing a path of a short-circuiting current in the event of a short-circuiting failure of a DC circuit.

FIG. 7 is a diagram showing a path of a short-circuiting current in a short-circuiting failure of the DC circuit. Referring to FIG. 7, a short-circuiting current SCC which flows from the high potential side toward the low potential side in DC circuit 4 flows in a direction from negative-side DC terminal Nn to positive-side DC terminal Np in power conversion device 101. When each arm circuit 6 constituting conversion circuit 1 includes full-bridge or hybrid converter cell 21F or 21HYB, short-circuiting current SCC flows only through bypass circuit 30 and does not flow through conversion circuit 1. When each arm circuit 6 is constituted only of half-bridge converter cells, most of short-circuiting current SCC flows through bypass circuit 30 but some of short-circuiting current SCC flows also through conversion circuit 1.

Specifically, in which of the plurality of arms 31au, 31av, 31aw, 31bu, 31bv, and 31bw constituting three-phase full-wave rectification circuit 37 of bypass circuit 30 short-circuiting current SCC flows is different depending on a phase of an AC current which flows between AC circuit 2 and power conversion device 101. In FIG. 7, as indicated by a path shown with a solid line, the current flows from negative-side connection arm 36b through U-phase and V-phase low-potential-side arms 31bu and 31bv to AC circuit 2 and flows from AC circuit 2 through W-phase positive-side arm 31aw and through positive-side connection arm 36a to DC circuit 4.

Similarly, when arm circuits 6au, 6av, 6aw, 6bu, 6bv, and 6bw constituting conversion circuit 1 are in a half-bridge configuration, in which arm circuit 6 the short-circuiting current flows is different depending on a phase of an AC current which flows between AC circuit 2 and power conversion device 101. In FIG. 7, as indicated by a path shown with a dashed line, the current flows from negative-side DC terminal Nn through u-phase negative-side arm circuit 6bu and v-phase negative-side arm circuit 6bv to AC circuit 2 and flows in a direction from AC circuit 2 through w-phase positive-side arm circuit 6aw to positive-side DC terminal Np.

A path of a current that flows through each arm circuit 6 in the event of a short-circuiting failure of DC circuit 4 will now be described in further detail.

Figure 8:
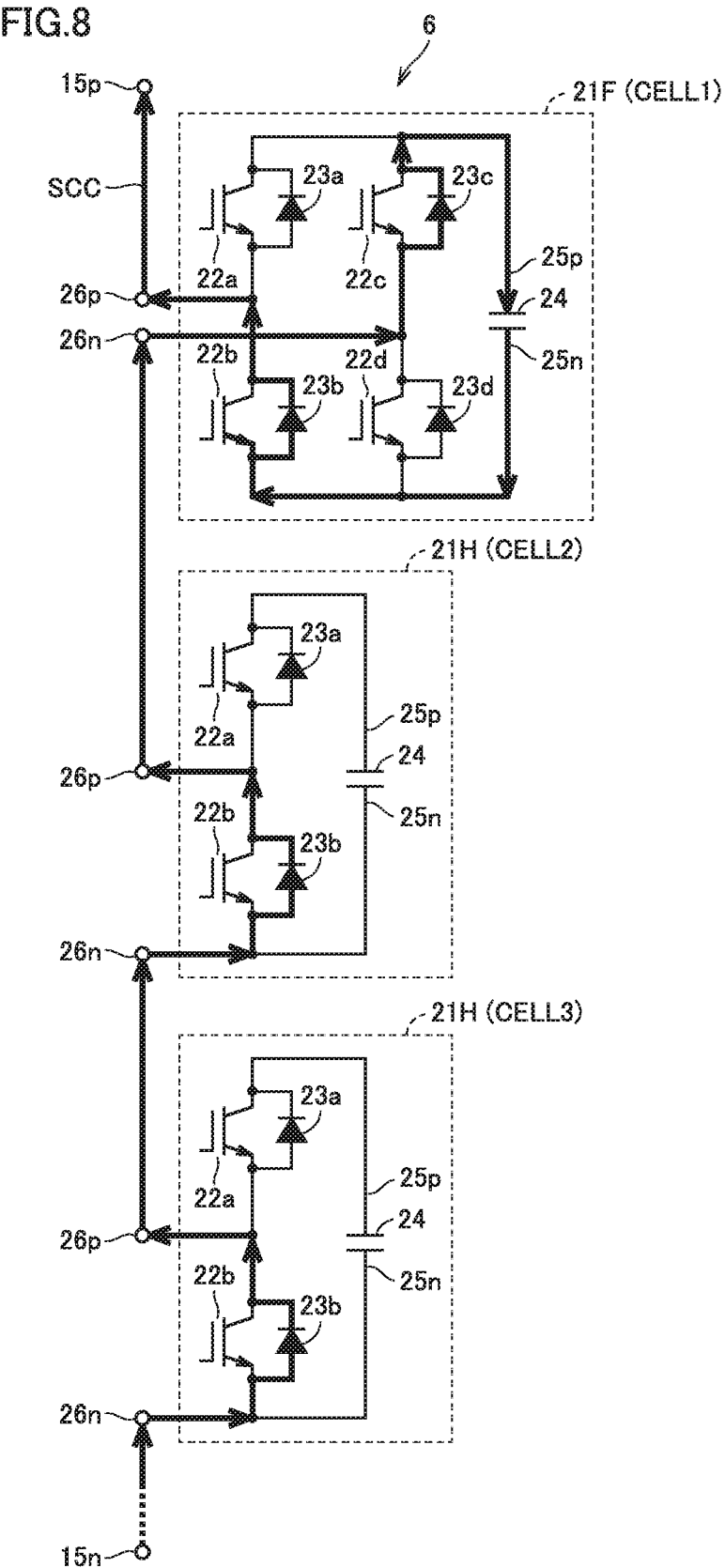
FIG. 8 is a diagram for illustrating a path of a current that temporarily flows through an arm circuit in the event of DC short-circuiting when the arm circuit includes a full-bridge circuit and a half-bridge circuit.

FIG. 8 is a diagram for illustrating a path of a current that temporarily flows through an arm circuit in the event of DC short-circuiting when the arm circuit includes a full-bridge circuit and a half-bridge circuit. The arm circuit in FIG. 8 includes one full-bridge converter cell 21F (CELL1) and other half-bridge converter cells 21H (CELL2, CELL3, . . . ). The path of the current is shown with a bold arrow in FIG. 8.

Referring to FIG. 8, when a short-circuiting failure occurs in DC circuit 4, in order to cut off a discharging current from DC capacitor 24 as an energy storage element of each cell 21, semiconductor switches 22a, 22b, 22c, and 22d in full-bridge converter cell 21F (CELL1) are all controlled to open (that is, turn off). Semiconductor switches 22a and 22b of all half-bridge converter cells 21H (CELL2, CELL3, . . . ) are all controlled to open (that is, turn off). A current may flow through freewheel diodes 23b in half-bridge converter cells 21H (CELL2 and CELL3).

In full-bridge converter cell 21F (CELL1), in the event of DC short-circuiting, a current temporarily flows in from input and output terminal 26n on the low potential side through a freewheel diode 23c into a positive-side terminal 25p of DC capacitor 24. A current temporarily flows in a direction from a negative-side terminal 25n of DC capacitor 24 through freewheel diode 23b to input and output terminal 26p on the high potential side. Consequently, if bypass circuit 30 is not provided, DC capacitor 24 constituting full-bridge converter cell 21F is kept charged and hence it may break due to overvoltage as a capacitor voltage exceeds a withstand voltage.

In the present embodiment, bypass circuit 30 is provided. Therefore, even though a current temporarily flows into DC capacitor 24 as a charging current in the event of DC short-circuiting, as a voltage generated in DC capacitor 24 reaches a voltage generated in arm reactor 7 and bypass circuit 30, short-circuiting current SCC thereafter flows only through bypass circuit 30. Consequently, a DC current is cut off by a DC capacitor and complete switching in path from conversion circuit 1 to bypass circuit 30 can be realized.

When at least half of converter cells included in each arm circuit 6 is constituted of full-bridge converter cells, flow-in of a short-circuiting current can be blocked by combination of capacitor voltages of a plurality of full-bridge converter cells and hence bypass circuit 30 is not required. In contrast, when the number of full-bridge converter cells 21F included in each arm circuit 6 is small (for example, not higher than 10%), bypass circuit 30 is required for switching in path of a DC short-circuiting current for protection of DC capacitor 24 included in converter cell 21F.

Figure 9:
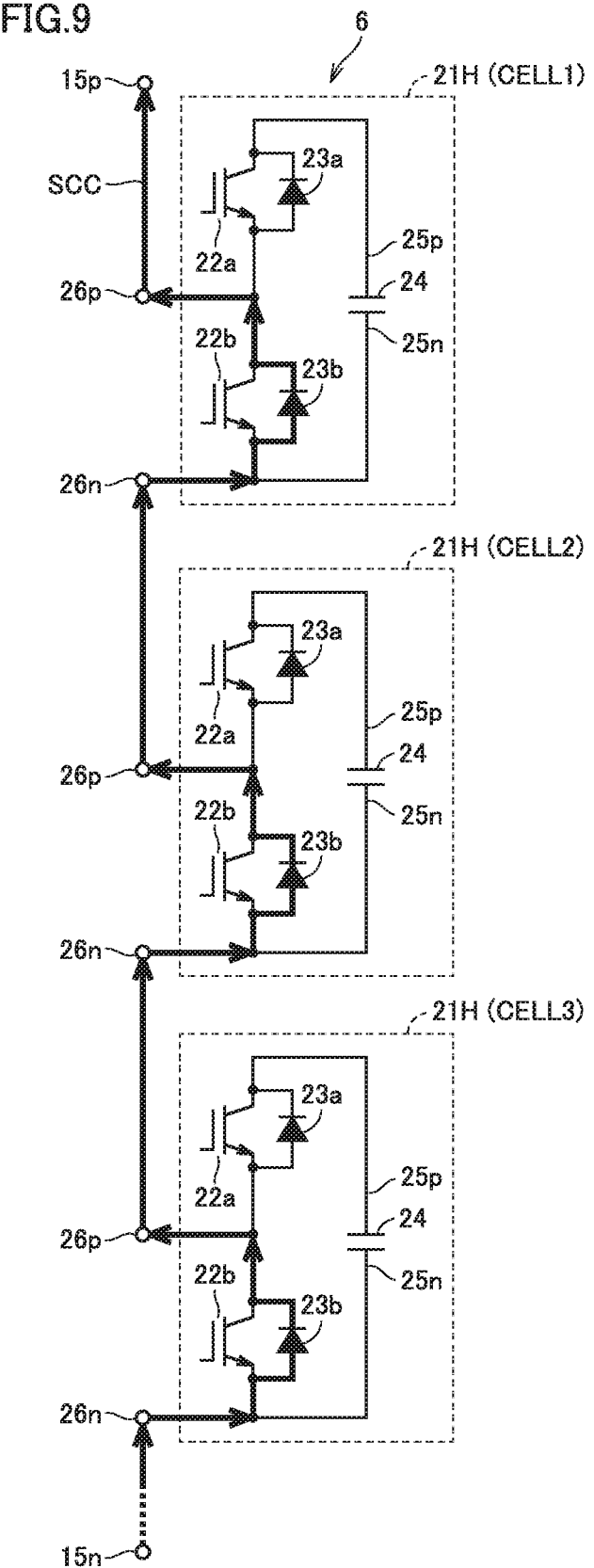
FIG. 9 is a diagram for illustrating a path of a DC short-circuiting current that flows through the arm circuit when the arm circuit is constituted only of a half-bridge circuit.

FIG. 9 is a diagram for illustrating a path of a DC short-circuiting current that flows through the arm circuit when the arm circuit is constituted only of a half-bridge circuit. The arm circuit in FIG. 9 includes only a plurality of half-bridge converter cells 21H (CELL1, CELL2, CELL3, . . . ). FIG. 9 shows a path of a short-circuiting current with a bold arrow.

Referring to FIG. 9, when a short-circuiting failure occurs in DC circuit 4, semiconductor switches 22a and 22b in converter cells CELL1, CELL2, CELL3, . . . constituting each arm circuit 6 are opened (turned off). In this case, the short-circuiting current flows also to freewheel diode 23b in each converter cell 21H and hence the short-circuiting current flows through both of bypass circuit 30 and arm circuit 6.

A fast diode having a fast switching characteristic such as a Schottky barrier diode is employed for freewheel diode 23b constituting each converter cell 21H. A fast diode tends to be high in on voltage with increase in withstand voltage. A rectification diode such as a pin diode is employed for bypass circuit 30. The rectification diode is less likely to be high in on voltage in spite of increase in withstand voltage. From the foregoing, in the event of a short-circuiting failure of DC circuit 4, an on voltage generated in diode element 32 of bypass circuit 30 is lower than an on voltage generated in freewheel diode 23b of converter cell 21H constituting each arm circuit 6. Most of DC short-circuiting current SCC thus flows through bypass circuit 30.

Control Operation by Power Conversion Device

Figure 10:
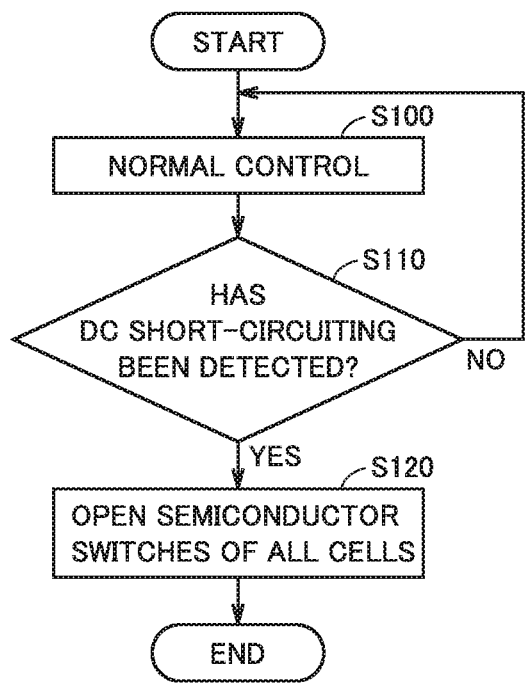
FIG. 10 is a flowchart schematically showing a control operation by a control device in FIG. 1.

FIG. 10 is a flowchart schematically showing a control operation by the control device in FIG. 1. A control operation by control device 5 in FIG. 1 will be described below with reference to FIGS. 2 and 10 while the description so far is summarized. In the description below, normal control is also referred to as a first operation mode and an operation mode in the event of a short-circuiting failure of DC circuit 4 is also referred to as a second operation mode.

When an accident is not occurring in the power system, control device 5 carries out normal control (step S100). In this case, control device 5 controls an output voltage from each converter cell 21 constituting each arm circuit 6. At least one of the plurality of converter cells 21 constituting each arm circuit 6 should be controlled to output a positive voltage so as not to generate a current through bypass circuit 30 (in the forward direction of diode element 32). Such control can be realized by avoiding an overmodulated state by using normal pulse width control with modulation factor limiter.

Then, when control device 5 detects a short-circuiting accident on a side of DC circuit 4 (YES in step S110), control device 5 controls semiconductor switching elements 22a, 22b, 22c, and 22d in all converter cells 21 constituting each arm circuit 6 to open (to turn off) (step S120). DC short-circuiting current SCC thus flows through bypass circuit 30. As described with reference to FIGS. 7 to 9, when each arm circuit 6 is constituted only of half-bridge converter cells 21H, some of DC short-circuiting current SCC flows also through arm circuit 6. When each arm circuit 6 includes at least one full-bridge or hybrid converter cell 21F or 21HYB, however, complete switching in path of DC short-circuiting current SCC from arm circuit 6 to bypass circuit 30 is realized.

A short-circuiting accident on the side of DC circuit 4 can be detected based on the fact that DC current Idc that flows through DC circuit 4 has become an overcurrent. The DC current is calculated as a total value of arm currents of all phases (Ipu+Ipv+Ipw or Inu+Inv+Inw). Alternatively, a DC current detector only for directly detecting DC current Idc may be provided on a line between DC circuit 4 and power conversion device 101.

Effect

As set forth above, according to power conversion device 101 in the first embodiment, three-phase full-wave rectification circuit 37, positive-side connection arm 36a, and negative-side connection arm 36b constitute bypass circuit 30 as a protective circuit so that the number of protective elements such as diode elements necessary for bypass circuit 30 can be decreased.

By including at least one full-bridge or hybrid converter cell 21F or 21HYB in each arm circuit 6 constituting conversion circuit 1, a path of DC short-circuiting current SCC can completely be switched from conversion circuit 1 to bypass circuit 30 in the event of a short-circuiting failure of DC circuit 4. Thus, DC capacitor 24 constituting full-bridge or hybrid converter cell 21F or 21HYB can be protected.

Modification of First Embodiment

An exemplary circuit in AC connection of AC circuit 2 to each leg circuit 12 with a transformer as an AC connection being interposed will be described below. The circuit described below is applicable also to a power conversion device in another embodiment of the present disclosure.

Figure 11:
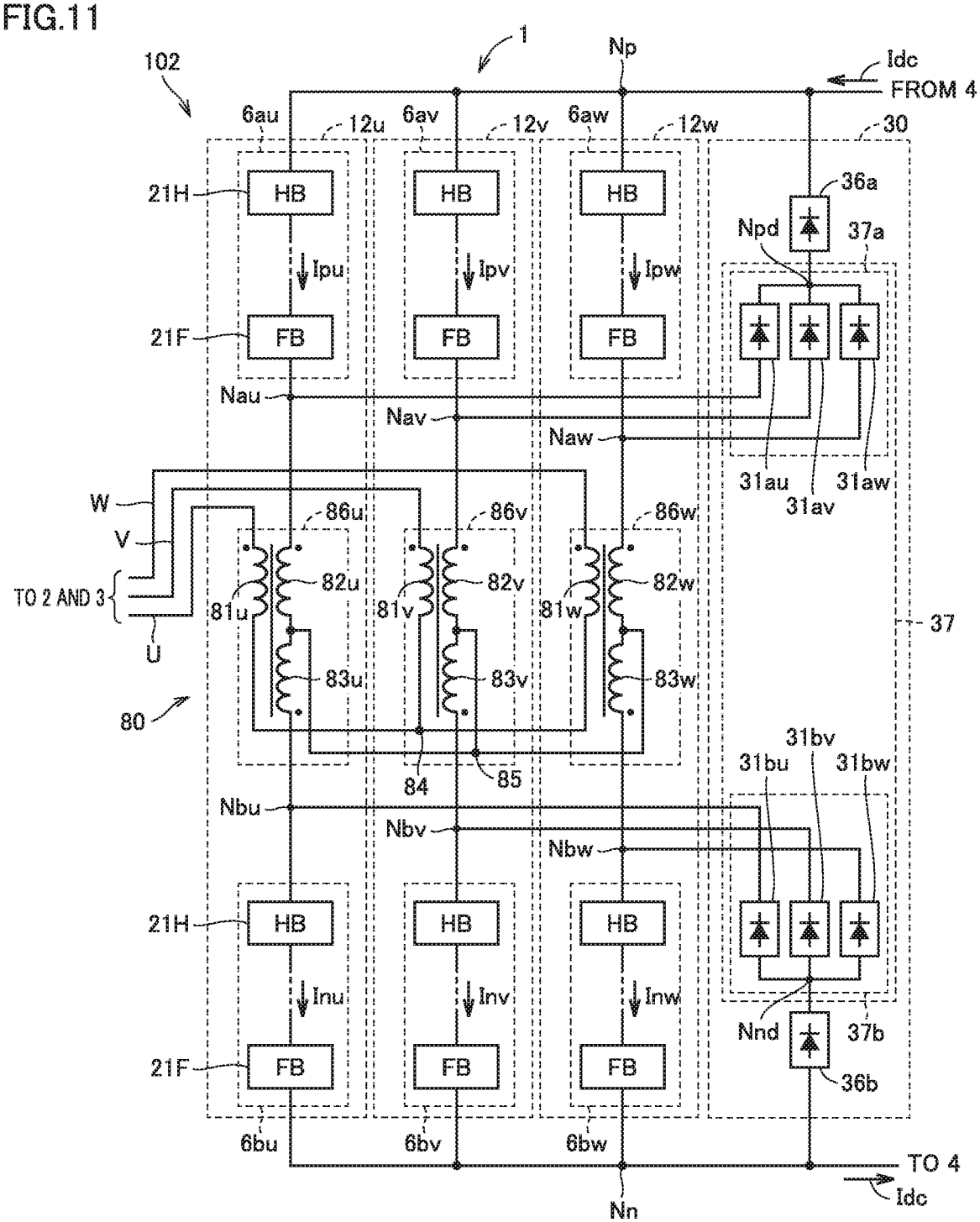
FIG. 11 is a schematic diagram of a configuration of the power conversion device according to a modification of the first embodiment.

FIG. 11 is a schematic diagram of a configuration of the power conversion device according to the modification of the first embodiment. Referring to FIG. 11, AC circuit 2 and leg circuits 12u, 12v, and 12w are connected to each other with a three-winding three-phase transformer 80 being interposed. Three-phase transformer 80 is constituted of a U-phase transformer 86u, a V-phase transformer 86v, and a W-phase transformer 86w.

Specifically, primary windings 81u, 81v, and 81w of three-phase transformer 80 in FIG. 11 have one ends connected to power transmission lines of the U phase, the V phase, and the W phase of AC circuit 2 with interconnected transformer 3 being interposed. Primary windings 81u, 81v, and 81w of three-phase transformer 80 have the other ends connected to a common neutral point 84. In FIG. 11, primary windings 81u, 81v, and 81w are Y-connected.

Secondary windings 82u, 82v, and 82w of three-phase transformer 80 are magnetically coupled to primary windings 81u, 81v, and 81w with a common core being interposed. Three-phase transformer 80 in FIG. 11 is further provided with tertiary windings 83u, 83v, and 83w connected in series to secondary windings 82u, 82v, and 82w, respectively. The secondary winding of each phase is connected to a corresponding tertiary winding as being opposite in polarity, and the secondary winding and the tertiary winding are wound around a common core. A point of connection between the secondary winding of each phase and the corresponding tertiary winding is connected to a common neutral point 85. The secondary windings are Y-connected and the tertiary windings are Y-connected.

Secondary winding 82u and tertiary winding 83u are connected in series to U-phase arm circuits 6au and 6bu. Secondary winding 82v and tertiary winding 83v are connected in series to V-phase arm circuits 6av and 6bv. Secondary winding 82w and tertiary winding 83w are connected in series to W-phase arm circuits 6aw and 6bw. In FIG. 11, secondary windings 82u, 82v, and 82w and tertiary windings 83u, 83v, and 83w also serve as reactors 7a and 7b of respective phases. Secondary windings 82u, 82v, and 82w and tertiary windings 83u, 83v, and 83w of three-phase transformer 80 may be provided separately from reactors 7a and 7b.

According to the configuration of three-phase transformer 80, advantageously, DC electromotive force generated in the secondary winding and electromotive force generated in the tertiary winding by an arm current of each phase (Ipu and Inu of the U phase, Ipv and Inv of the V phase, and Ipw and Inw of the W phase) cancel each other and a DC magnetic flux is not generated in a core.

Connection between three-phase transformer 80 and bypass circuit 30 will now be described. Initially, connection nodes between secondary windings 82u, 82v, and 82w and positive-side arm circuits 6au, 6av, and 6aw are denoted as Nau, Nav, and Naw, respectively. Connection nodes between tertiary windings 83u, 83v, and 83w and negative-side arm circuits 6bu, 6bv, and 6bw are denoted as Nbu, Nbv, and Nbw, respectively. Bypass circuit 30 is connected to these connection nodes Nau, Nav, Naw, Nbu, Nbv, and Nbw.

Specifically, U-phase positive-side arm 31au of three-phase full-wave rectification circuit 37 constituting bypass circuit 30 is connected between positive-side intermediate node Npd and high-potential-side U-phase connection node Nau. Similarly, V-phase positive-side arm 31av is connected between positive-side intermediate node Npd and high-potential-side V-phase connection node Nay. W-phase positive-side arm 31aw is connected between positive-side intermediate node Npd and high-potential-side W-phase connection node Naw.

U-phase negative-side arm 31bu of three-phase full-wave rectification circuit 37 constituting bypass circuit 30 is connected between negative-side intermediate node Nnd and low-potential-side U-phase connection node Nbu. Similarly, V-phase negative-side arm 31bv is connected between negative-side intermediate node Nnd and low-potential-side V-phase connection node Nbv. W-phase negative-side arm 31bw is connected between negative-side intermediate node Nnd and low-potential-side W-phase connection node Nbw.

Second Embodiment

In a second embodiment, a variation of the configuration of bypass circuit 30 will be described with reference to FIGS. 12 to 14.

Exemplary Configuration of Connection Arm of Bypass Circuit

Figure 12:
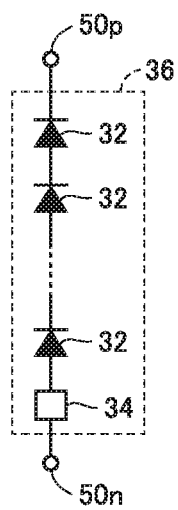
FIG. 12 is a circuit diagram showing a configuration of a connection arm of the bypass circuit in the power conversion device in a second embodiment.

FIG. 12 is a circuit diagram showing a configuration of the connection arm of the bypass circuit in the power conversion device in the second embodiment.

Referring to FIG. 12, connection arm 36 provided in bypass circuit 30 is different from connection arm 36 in FIG. 5 in further including, in addition to a plurality of diode elements 32 connected in series, switching element 34 connected in series to these diode elements 32. Switching element 34 may be connected to any one end of a string of diode elements 32 connected in series or between adjacent diode elements 32.

Switching element 34 may be controlled to turn off (open) in the first operation mode (during a normal operation) and controlled to turn on (closed) in the second operation mode (in the event of a short-circuiting failure of the DC circuit). Alternatively, switching element 34 may be implemented by an element including a high-potential-side terminal and a low-potential-side terminal and having such a non-linear current and voltage characteristic that a voltage across these terminals is lowered as a result of a flow of a current between these terminals at the time when a voltage applied across these terminals exceeds a threshold voltage (that is, switching from off to on). Examples of such a non-linear element include a discharge gap or a self-ignition thyristor as illustrated in FIG. 13.

Specific Example of Switching Element

Figure 13:
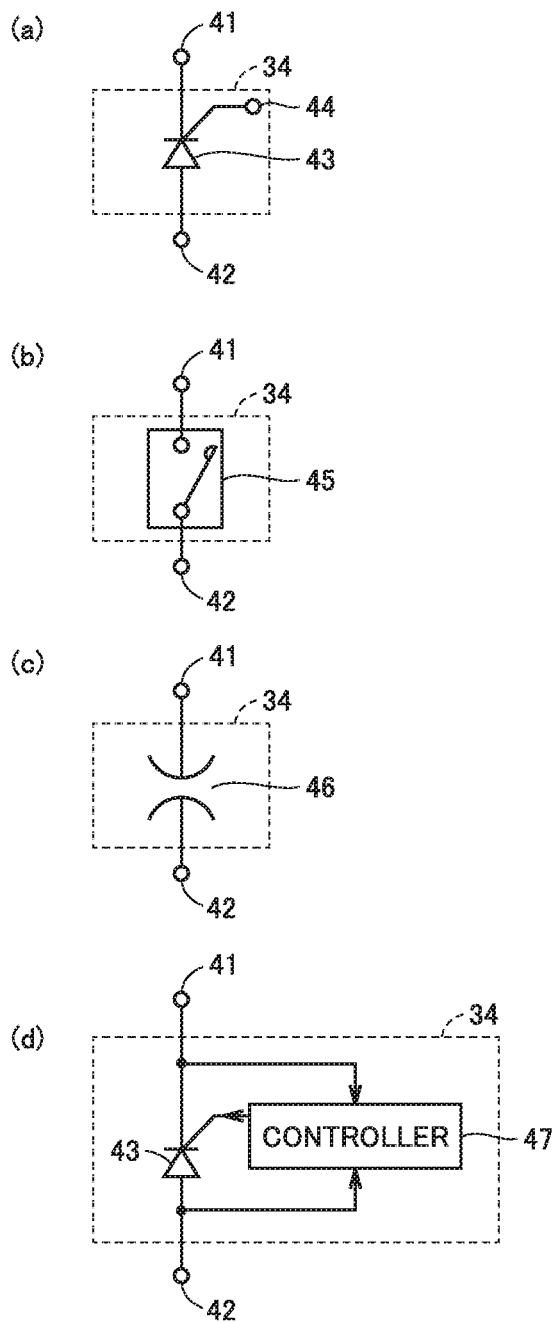
FIG. 13 is a circuit diagram showing an exemplary configuration of a switching element included in the connection arm shown in FIG. 12.

FIG. 13 is a circuit diagram showing a specific exemplary configuration of the switching element included in the connection arm shown in FIG. 12.

FIG. 13 (a) shows an example in which switching element 34 is implemented by a thyristor 43. Thyristor 43 has a cathode connected to a high-potential-side node 41 and an anode connected to a low-potential-side node 42. A gate of thyristor 43 receives an input of a control signal from control device 5 shown in FIG. 1. Control device 5 controls thyristor 43 to turn on when it detects a short-circuiting failure of DC circuit 4 and otherwise controls thyristor 43 to turn off.

FIG. 13 (b) shows an example in which switching element 34 is implemented by a mechanical switch 45 connected between high-potential-side node 41 and low-potential-side node 42. Mechanical switch 45 is controlled to turn on and off by control device 5 shown in FIG. 1. Control device 5 controls mechanical switch 45 to turn on when it detects a short-circuiting failure of DC circuit 4 and otherwise controls mechanical switch 45 to turn off.

FIG. 13 (c) shows an example in which switching element 34 is implemented by a discharge gap 46 connected between high-potential-side node 41 and low-potential-side node 42. Discharge gap 46 is made up, for example, of two hemispherical metal plates such that projecting surfaces of the metal plates face each other. No current flows in discharge gap 46 until a voltage across opposing metal plates attains to a threshold voltage. When the voltage exceeds the threshold voltage, however, dielectric breakdown in air occurs between the opposing metal plates so that discharge gap 46 is short-circuited and a current flows through connection arm 36.

FIG. 13 (d) shows an example in which switching element 34 is implemented by a self-ignition thyristor connected between high-potential-side node 41 and low-potential-side node 42. The self-ignition thyristor can be implemented, for example, by using a controller 47 that renders thyristor 43 conducting by supplying a voltage to the gate of thyristor 43 when a voltage across high-potential-side node 41 and low-potential-side node 42 exceeds a threshold voltage.

Advantageous Effect

By interposing switching element 34 in connection arm 36 of the bypass circuit 30 as in FIG. 12, when the power system is normally operating, no current flows in a direction from negative-side DC terminal Nn toward AC terminals Nu, Nv, and Nw or in a direction from AC terminals Nu, Nv, and Nw toward positive-side DC terminal Np through connection arm 36 of bypass circuit 30. Therefore, unlike the first embodiment, at least one of the plurality of converter cells 21 constituting each arm circuit 6 does not have to be controlled to output a positive voltage (that is, all converter cells 21 constituting each arm circuit 6 may be controlled such that output voltages therefrom are zero voltages).

In addition, as in the first embodiment, the number of protective elements such as diode elements necessary for bypass circuit 30 as a protective circuit can be reduced. By including at least one full-bridge or hybrid converter cell 21F or 21HYB in each arm circuit 6 constituting conversion circuit 1, a path of DC short-circuiting current SCC can completely be switched from conversion circuit 1 to bypass circuit 30 in the event of a short-circuiting failure of DC circuit 4.

Modification of Connection Arm of Bypass Circuit

FIG. 14 is a circuit diagram showing a modification of the bypass circuit in FIG. 12. Connection arm 36 of bypass circuit 30 shown in FIG. 14 (a) is different from connection arm 36 of bypass circuit 30 shown in FIG. 12 in including an avalanche diode as each diode element 32 and including a resistive element 35 connected in parallel to switching element 34.

By allowing a leakage current from the avalanche diode to flow in the direction from high-potential-side node 50p to low-potential-side node 50n during a normal operation of the power system, voltages allocated to diode elements 32 are made uniform. In order to allow the leakage current to flow, resistive element 35 is provided in parallel to switching element 34. When switching element 34 is implemented by a non-linear element as illustrated in FIGS. 13 (c) and (d), a resistance value of resistive element 35 is selected such that a voltage generated as a result of flow of the leakage current through resistive element 35 does not reach a threshold voltage (a conduction start voltage) of switching element 34.

Connection arm 36 of bypass circuit 30 shown in FIG. 14 (b) represents a modification different from that in FIG. 14 (a). Specifically, connection arm 36 of bypass circuit 30 shown in FIG. 14 (b) is different from connection arm 36 of bypass circuit 30 shown in FIG. 12 in including resistive element 33 provided in parallel to each diode element 32 and resistive element 35 provided in parallel to switching element 34. Resistive elements 33 are substantially equal in resistance value to one another. Since voltages allocated to diode elements 32 are thus substantially equal, diode elements 32 can be prevented from breaking.

A resistance value of resistive element 33 is set to a relatively high value such that substantially no current flows through each resistive element 33 in the direction from high-potential-side node 50p toward low-potential-side node 50n during a normal operation of the power system. When switching element 34 is implemented by a non-linear element as illustrated in FIGS. 13 (c) and (d), resistance values of resistive elements 33 and 35 are set such that a voltage generated in resistive element 35 by a current which flows through resistive element 33 and resistive element 35 does not reach a threshold voltage (current conduction start voltage) of switching element 34.

Third Embodiment

Problem at the Time of Start of Power Conversion Device

A third embodiment addresses an example in which full-bridge or hybrid converter cell 21F or 21HYB and half-bridge converter cell 21H are present in each arm circuit 6 as being mixed in power conversion device 101 in the second embodiment. The third embodiment further addresses an example in which switching element 34 provided in connection arm 36 of bypass circuit 30 is implemented by a non-linear element as illustrated in FIGS. 13 (c) and (d). In such a case, a problem at the time of start of power conversion device 101 as described below arises.

Referring to FIG. 1, when power conversion device 101 is started, a circuit breaker (not shown) provided between AC circuit 2 and power conversion device 101 is closed. DC capacitor 24 provided in each converter cell 21 is thus charged with AC power from AC circuit 2. Since each converter cell 21 normally operates with a charging voltage of DC capacitor 24 provided in each converter cell 21 being used as a power supply (without necessarily being limited to this power supply configuration), each converter cell does not operate until charging of DC capacitor 24 proceeds to some extent. During a period until a voltage of DC capacitor 24 increases and reaches a defined value, all semiconductor switching elements 22a, 22b, 22c, and 22d in each converter cell 21 are opened (turned off).

At the time of start in the example above, DC capacitor 24 in full-bridge converter cell 21F (and hybrid converter cell 21HYB) is charged twice as fast as DC capacitor 24 in half-bridge converter cell 21H for the following reason. Referring to FIG. 3 (a), in half-bridge converter cell 21H, DC capacitor 24 is charged when a current flows into converter cell 21H in the direction from input and output terminal 26p on the high potential side to input and output terminal 26n on the low potential side, whereas DC capacitor 24 is not charged when a current flows in a reverse direction. In contrast, in full-bridge converter cell 21F (and hybrid converter cell 21HYB), DC capacitor 24 is charged when the current may flow in either direction. When DC capacitor 24 is being charged with an upward current in a direction from input and output terminal 26n on the low-potential side to input and output terminal 26p on the high-potential side, DC capacitor 24 generates a voltage in such a direction that a current flows to bypass circuit 30.

Therefore, when a charging voltage of DC capacitor 24 in full-bridge converter cell 21F (or hybrid converter cell 21HYB) exceeds the threshold voltage of switching element 34 provided in connection arm 36 of bypass circuit 30 before control device 5 starts control at the time of start of power conversion device 101, a current conducts to switching element 34. Switching element 34 which could withstand repeated current conduction might be applicable, however, if it is not the case, the circuit configuration should be devised such that current conduction through switching element 34 does not occur at the time of start. For example, measures below can be taken.

Exemplary Measures Against Problem in Starting (1) A power supply circuit for driving a semiconductor switching element in full-bridge converter cell 21F should be operable at a voltage as low as possible (which is referred to as a "low-voltage circuit").

Full-bridge converter cell 21F is started at a voltage as low as possible, and after converter cell 21F is started, any one of semiconductor switching elements 22a, 22b, 22c, and 22d in full-bridge converter cell 21F in FIG. 3 (b) is closed (turned on). DC capacitor 24 can thus be charged only for half a cycle of an alternating current. When any one of semiconductor switching elements 22a and 22d is closed (turned on) in full-bridge converter cell 21F, capacitor 24 is charged when a current flows in a direction from positive-side input and output terminal 26p to negative-side input and output terminal 26n (a direction downward in the figure) and hence an operation is totally equivalent to that of half-bridge converter cell 21H. When any one of semiconductor switching elements 22b and 22c is closed (turned on), capacitor 24 is charged when a current flows in a direction from negative-side input and output terminal 26n to positive-side input and output terminal 26p (a direction upward in the figure).

Similarly, also in hybrid converter cell 21HYB in FIG. 3 (c), a rate of charging can be lowered by closing (turning on) any one of three semiconductor switching elements 22.

Until control is switched to turn on one of semiconductor switching elements 22a and 22d in full-bridge converter cell 21F, increase in voltage of capacitor 24 is greater in full-bridge converter cell 21F than in half-bridge converter cell 21H. Therefore, when capacitor 24 in full-bridge converter cell 21F and capacitor 24 in half-bridge converter cell 24h are charged at an identical rate after switching of control, full-bridge cell 21F attains to a defined voltage earlier. In order to avoid this problem, for example, capacitor 24 in full-bridge cell 21F may desirably be higher in capacity than capacitor 24 in half-bridge cell 21H. Other methods for avoiding this problem will be described in a next section (2).

Figure 15:
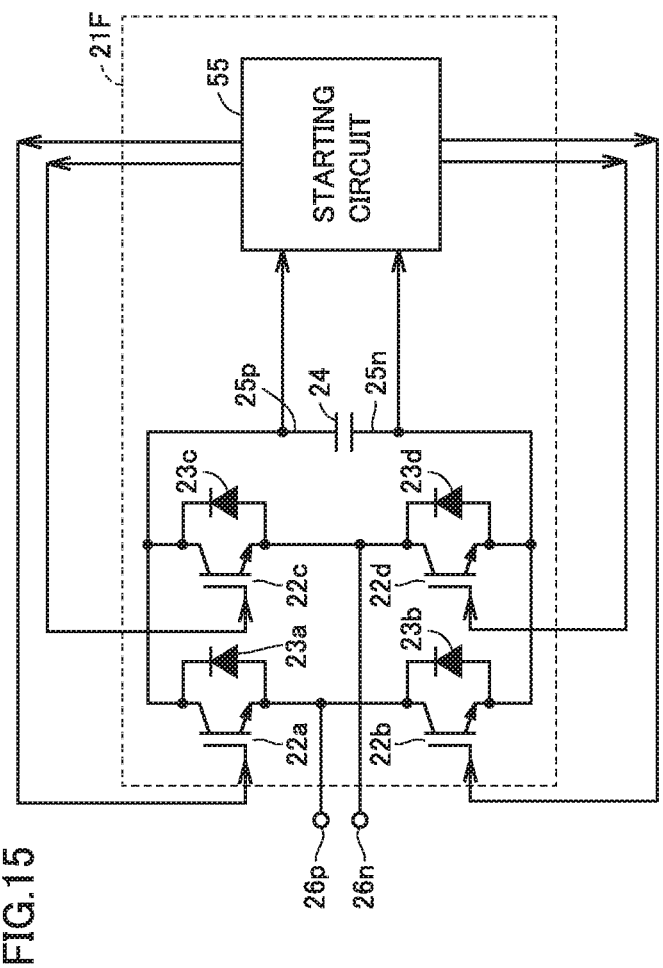
FIG. 15 is a circuit diagram showing connection of a starting circuit 55 provided in a full-bridge converter cell in a power conversion device in a third embodiment.
Figure 16:
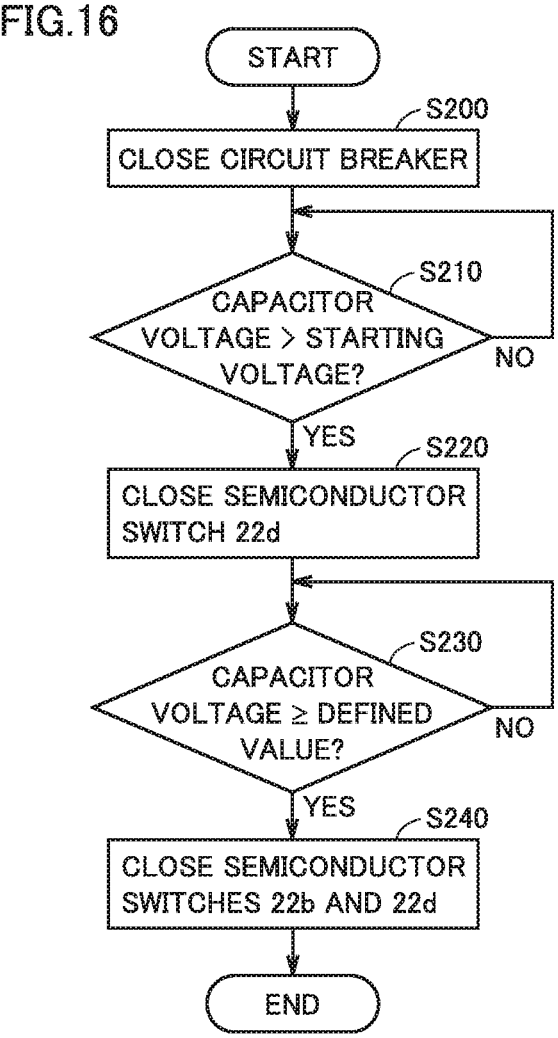
FIG. 16 is a flowchart showing an operation by starting circuit 55 in FIG. 15.

(2) A starting circuit dedicated for full-bridge converter cell 21F is provided. FIG. 15 is a circuit diagram showing connection of a starting circuit 55 provided in a full-bridge converter cell in the power conversion device in the third embodiment. FIG. 16 is a flowchart showing an operation by starting circuit 55 in FIG. 15.

Referring to FIGS. 15 and 16, starting circuit 55 is driven by a charging voltage for DC capacitor 24 and configured to be operable at a voltage as low as possible. Starting circuit 55 starts operating when a charging voltage for DC capacitor 24 exceeds a starting voltage (YES in step S210) after a circuit breaker (not shown) is closed between AC circuit 2 and power conversion device 101 in FIG. 1 (step S200). The starting voltage is set to a voltage as low as possible. Until starting circuit 55 operates, semiconductor switching elements 22a to 22d are all open (turned off).

Starting circuit 55 closes (turns on) any one of semiconductor switching elements 22a and 22d in converter cell 21F (step S220) after it starts operating. Other semiconductor switching elements are open (turned off). Thus, as in half-bridge converter cell 21H, DC capacitor 24 is charged only for half a cycle of an alternating current.

Then, starting circuit 55 detects a voltage of capacitor 24 and determines whether or not a voltage of capacitor 24 has attained to a defined value (step S230). When the voltage of capacitor 24 has attained to the defined value (YES in step S230), both of semiconductor switching elements 22b and 22d or both of semiconductor switching elements 22a and 22c are closed (turned on) (step S240). In other words, two switching elements on adjacent upper arms or adjacent lower arms of four arms implementing the full bridge are closed (turned on). Since a current thus flows as bypassing capacitor 24, charging of capacitor 24 can be stopped.

As in (1) above, any one of semiconductor switching elements 22a, 22b, 22c, and 22d may be closed (turned on) by starting circuit 55 in step S220. In hybrid converter cell 21HYB, any one of three semiconductor switching elements 22 is closed (turned on).

In step S240, also in hybrid converter cell 21HYB (see FIG. 3 (c)), two semiconductor switching elements provided on adjacent upper arms or adjacent lower arms of four arms implementing the hybrid bridge are closed (turned on). For example, in converter cell 21HYB shown in FIG. 3 (c), semiconductor switching elements 22b and 22d are closed (turned on).

Figure 17:
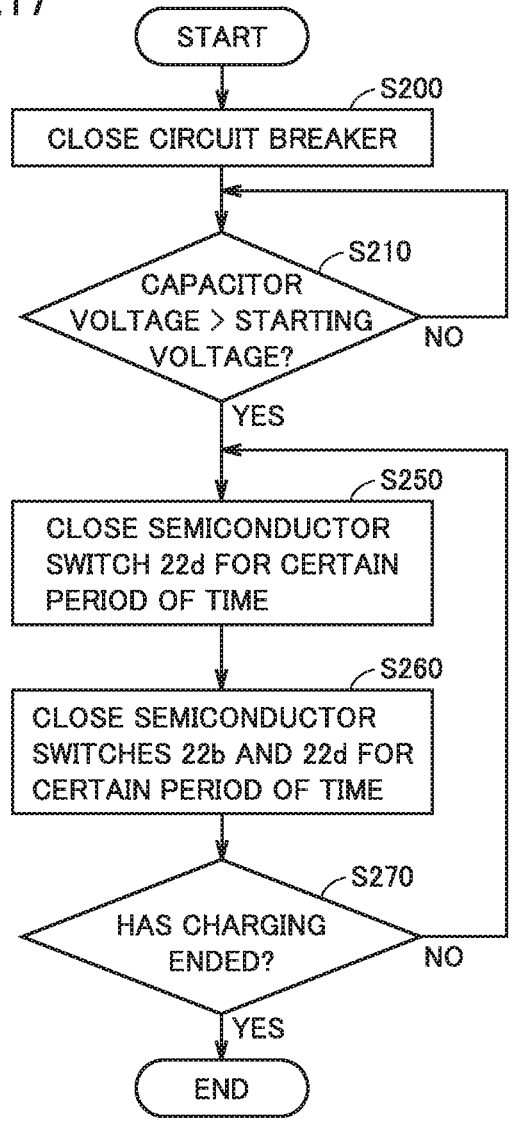
FIG. 17 is a flowchart of a modification of FIG. 16.

FIG. 17 is a flowchart of a modification of FIG. 16. Referring to FIGS. 15 and 17, a process until starting circuit 55 starts operating (steps S200 and S210) is the same as in FIG. 16 and description will not be repeated.

Starting circuit 55 alternately repeats, after it starts operating, a first control state (step S250) in which any one of semiconductor switching elements 22a and 22d constituting converter cell 21F is controlled to turn on (close) for a certain period of time and a second control state (step S260) in which semiconductor switching elements (22a and 22c) or (22b and 22d) are controlled to turn on (close) for a certain period of time (any of step S250 and step S260 may be performed first). Capacitor 24 in half-bridge cell 21H can thus be higher in rate of charging than capacitor 24 in full-bridge cell 21F.

Steps S250 and S260 are repeated until the voltage of capacitor 24 attains to the defined value and charging ends (until determination as YES is made in step S270). A ratio between the certain period of time in step S250 and the certain period of time in step S260 is adjusted such that capacitor 24 in half-bridge cell 21H and capacitor 24 in full-bridge cell 21F are equal to each other in voltage when charging ends.

Any one of semiconductor switching elements 22a, 22b, 22c, and 22d may be closed (turned on) by starting circuit 55 in step S250. In hybrid converter cell 21HYB, any one of three semiconductor switching elements 22 is closed (turned on).

In step S260, semiconductor switching elements 22a and 22c instead of semiconductor switching elements 22b and 22d may be closed (turned on) by starting circuit 55 (in other words, two semiconductor switching elements provided on adjacent upper arms or adjacent lower arms of the full bridge are closed (turned on)). In hybrid converter cell 21HYB (see FIG. 3 (c)), two semiconductor switching elements provided on adjacent lower arms are closed (turned on). For example, in converter cell 21HYB shown in FIG. 3 (c), semiconductor switching elements 22b and 22d are closed (turned on).

(3) A normally closed switch is provided in parallel to any one of semiconductor switching elements implementing the full bridge.

Figure 18:
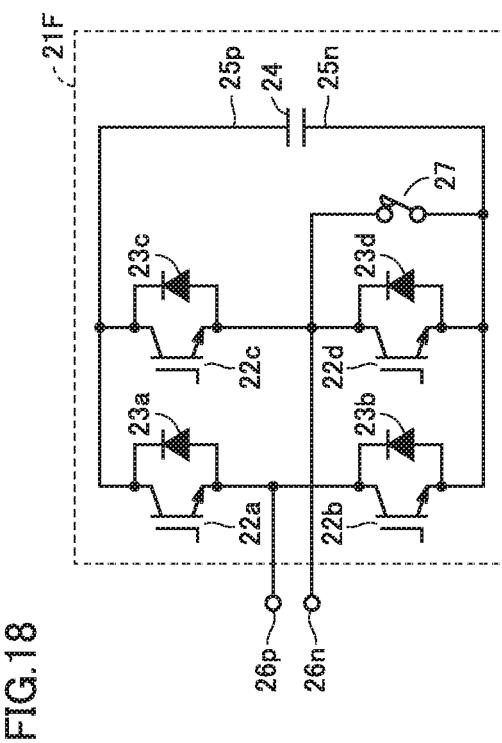
FIG. 18 is a circuit diagram showing a modification of a full-bridge converter cell in FIG. 3 (b).

FIG. 18 is a circuit diagram showing a modification of the full-bridge converter cell in FIG. 3 (b). Converter cell 21F in FIG. 18 is different from converter cell 21F in FIG. 3 (b) in including a normally closed (closed at the time of start) switch 27 provided in parallel to semiconductor switching element 22d and FIG. 18 is otherwise the same as FIG. 3 (b).

According to the configuration in FIG. 18, as in half-bridge converter cell 21H, DC capacitor 24 is charged only for half a cycle of an alternating current at the time of start of power conversion device 101. Switch 27 is opened (turned off) after power conversion device 101 is started. Switch 27 may be a mechanical switch or a semiconductor switch.

Switch 27 may be connected in parallel to any one of semiconductor switching elements 22a, 22b, 22c, and 22d. In hybrid converter cell 21HYB, switch 27 is connected in parallel to any one of three semiconductor switching elements 22a, 22b, and 22d and freewheel diode 23c.

(4) A resistive element is connected in parallel to switching element 34. A resistance value of this resistive element is set to a relatively small value such that current conduction through switching element 34 does not occur owing to a voltage generated in the resistive element at the time of start of power conversion device 101. A resistance value of resistive element 35 can be set such that bypass circuit 30 described with reference to FIGS. 14 (a) and (b) also functions similarly.

Figure 19:
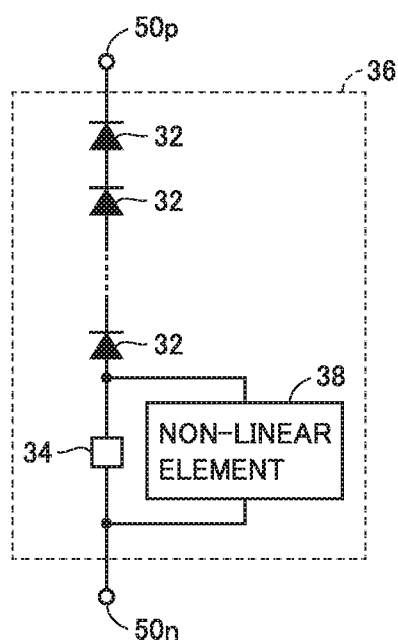
FIG. 19 is a circuit diagram showing yet another modification of the bypass circuit in FIG. 12.

(5) A non-linear element is provided in parallel to switching element 34. FIG. 19 is a circuit diagram showing yet another modification of the bypass circuit in FIG. 12.

Bypass circuit 30 in FIG. 19 is different from connection arm 36 of bypass circuit 30 in FIG. 12 in further including a non-linear element 38 connected in parallel to switching element 34. Non-linear element 38 is implemented, for example, by a Zener diode and it is an element which has such non-linear current and voltage characteristics that a current abruptly increases when a voltage is equal to or greater than a threshold value. A threshold voltage of non-linear element 38 is set to be lower than a threshold voltage of switching element 34.

According to the configuration in FIG. 19, when a current is low, for example, in initial charging of capacitor 24 in each converter cell 21, a current flows through non-linear element 38 in connection arm 36 of bypass circuit 30. When a high current flows due to a short-circuiting accident in DC circuit 4, a voltage across main electrodes of non-linear element 38 increases and exceeds a threshold voltage of switching element 34 and consequently a current flows through switching element 34. Undue current conduction through switching element 34 at the time of initial charging can thus be avoided.

In FIG. 19 as well, as described with reference to FIG. 14 (a), an avalanche diode may be employed as each diode element 32 and resistive element 35 for allowing a leakage current to flow may be provided in parallel to both of switching element 34 and non-linear element 38. Alternatively, as described with reference to FIG. 14 (b), resistive element 33 may be provided in parallel to each diode element 32 and resistive element 35 may be provided in parallel to both of switching element 34 and non-linear element 38. According to such a circuit configuration, voltages can uniformly be allocated to diode elements 32.

Fourth Embodiment

Means for realizing complete switching in path of a short-circuiting current from conversion circuit 1 to bypass circuit 30 at the time of occurrence of an accident in DC circuit 4 by using only half-bridge converter cell 21H but without using full-bridge converter cell 21F will be described in a fourth embodiment.

Figure 20:
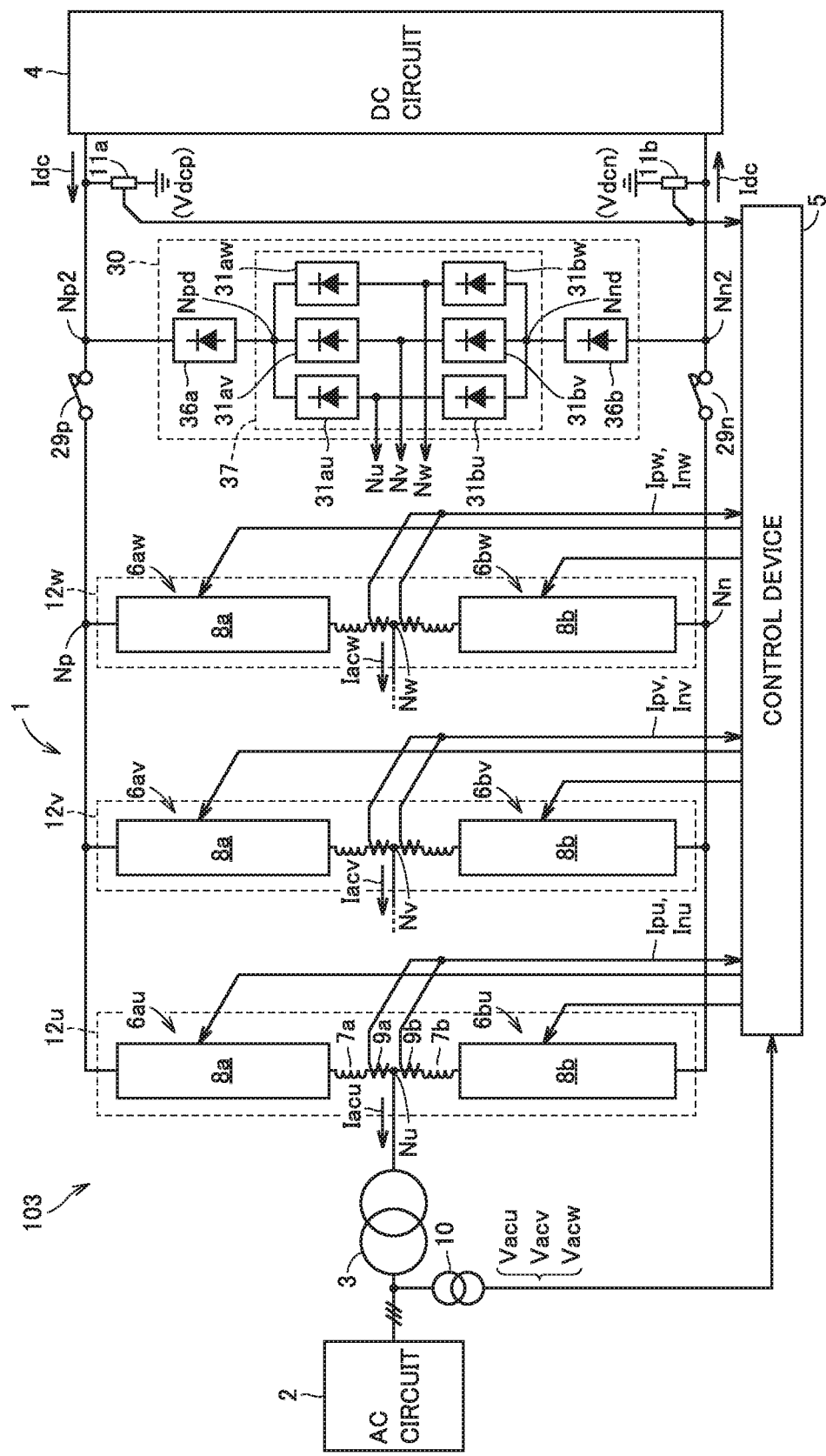
FIG. 20 is a schematic diagram of a configuration of a power conversion device according to a fourth embodiment.

FIG. 20 is a schematic diagram of a configuration of a power conversion device according to the fourth embodiment. A power conversion device 103 in FIG. 20 is different from power conversion device 101 in FIG. 1 in further including a positive-side switch 29p and a negative-side switch 29n. Positive-side switch 29p and negative-side switch 29n (which are collectively denoted as a switch 29) are provided to isolate positive-side DC terminal Np and negative-side DC terminal Nn to which leg circuits 12u, 12v, and 12w are connected in common from a positive-side DC terminal Np2 and a negative-side DC terminal Nn2 to which bypass circuit 30 is connected.

More specifically, second positive-side DC terminal Np2 to which bypass circuit 30 is connected is provided on a DC line connecting positive-side DC terminal Np and DC circuit 4 to each other. Positive-side switch 29p is provided between positive-side DC terminal Np and second positive-side DC terminal Np2 and switches between conduction and non-conduction between positive-side DC terminal Np and second positive-side DC terminal Np2.

Similarly, second negative-side DC terminal Nn2 to which bypass circuit 30 is connected is provided on a DC line connecting negative-side DC terminal Nn and DC circuit 4 to each other. Negative-side switch 29n is provided between negative-side DC terminal Nn and second negative-side DC terminal Nn2 and switches between conduction and non-conduction between negative-side DC terminal Nn and second negative-side DC terminal Nn2.

Switch 29 may be a mechanical switch or a semiconductor switch. Switch 29 is desirably normally closed. Since FIG. 20 is otherwise the same as FIG. 2, the same or corresponding elements have the same reference characters allotted and description will not be repeated.

Figure 21:
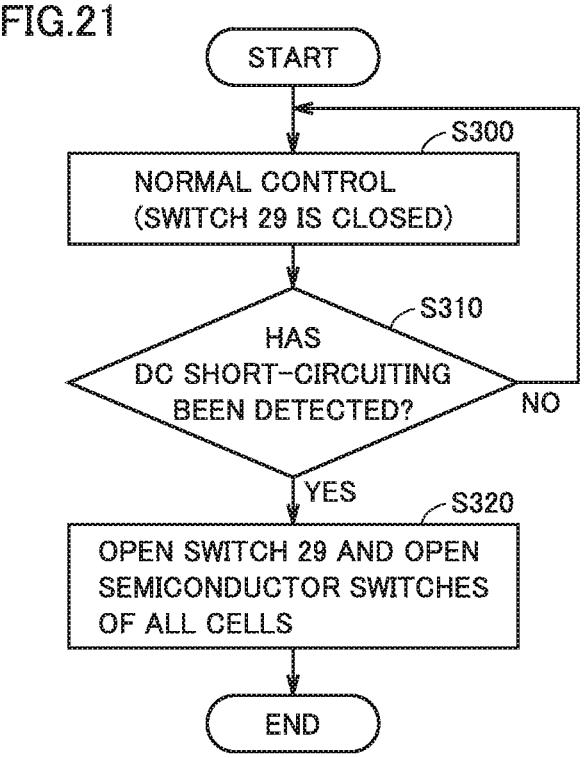
FIG. 21 is a flowchart showing an exemplary control operation by the power conversion device in FIG. 20.

FIG. 21 is a flowchart showing an exemplary control operation by the power conversion device in FIG. 20. Referring to FIGS. 20 and 21, when an accident is not occurring in the power system, control device 5 carries out normal control as in FIG. 10 (step S300). In this case, control device 5 controls switch 29 (29p and 29n) to close (turn on).

Then, when control device 5 detects a short-circuiting accident on the side of DC circuit 4 (for example, an absolute value of arm current Ipu, Ipv, Ipw, Inu, Inv, or Inw exceeds a threshold value or a total value of arm currents of the phases exceeds the threshold value) (YES in step S310), it opens (turns off) semiconductor switching elements 22a and 22b in all converter cells 21H constituting each arm circuit 6 and controls switch 29 (29p and 29n) to open (turn off) (step S320).

For example, when a short-circuiting accident occurs in DC circuit 4, an excessively high arm current is detected (YES in step S310). In this case, switch 29 is opened (turned off) so that complete switching in path of a short-circuiting current from conversion circuit 1 to bypass circuit 30 can be realized.

Fifth Embodiment

In a fifth embodiment, an example in which connection arm 36 of bypass circuit 30 is constituted only of a switch without including diode element 32 will be described as a modification of the embodiment.

Figure 22:
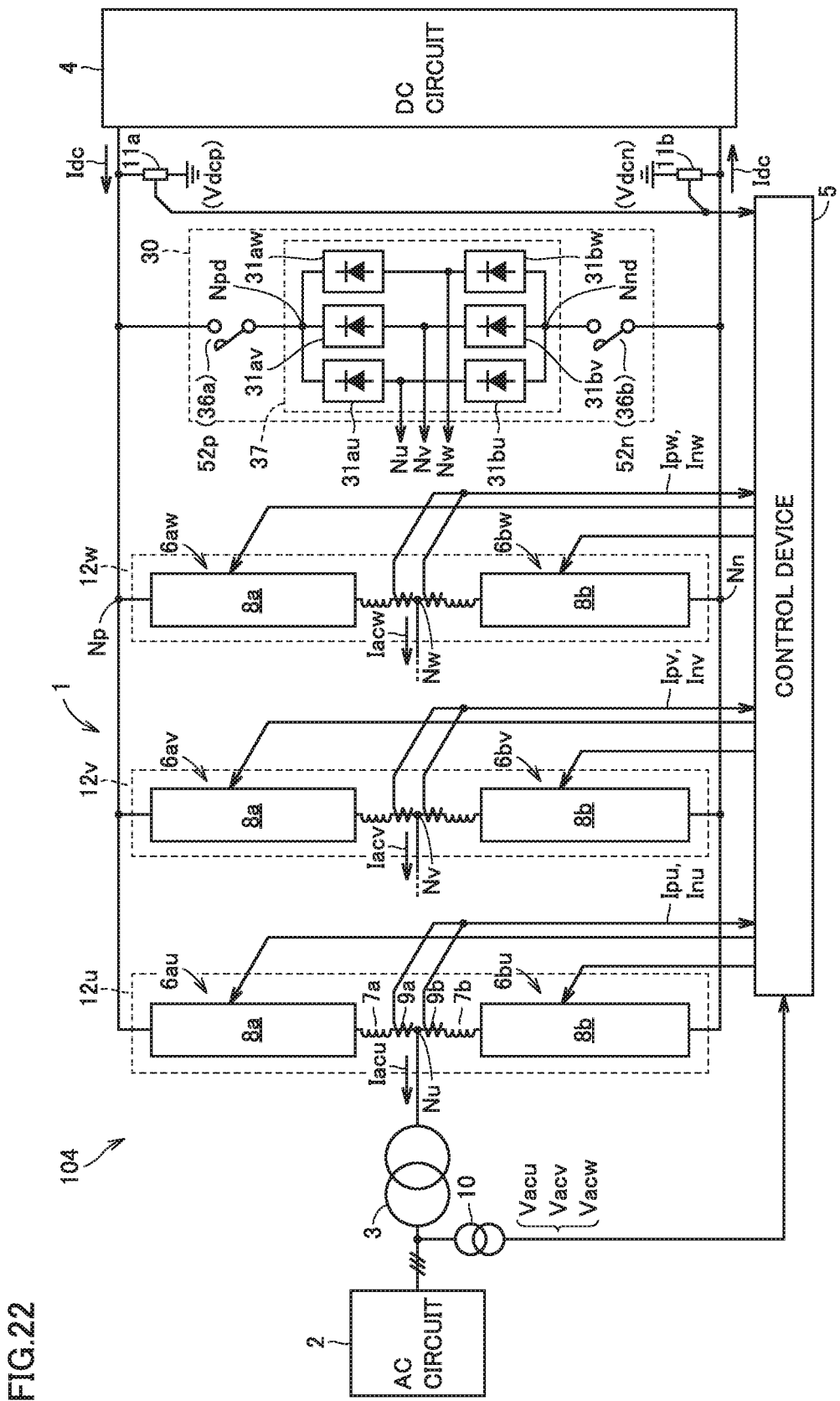
FIG. 22 is a schematic diagram of a configuration of a power conversion device according to a fifth embodiment.

FIG. 22 is a schematic diagram of a configuration of a power conversion device according to the fifth embodiment. Bypass circuit 30 in a power conversion device 104 in FIG. 22 is different from bypass circuit 30 of power conversion device 101 in FIG. 1 in that positive-side connection arm 36a includes only a positive-side switch 52p and negative-side connection arm 36b includes only a negative-side switch 52n. Positive-side switch 52p is connected between positive-side DC terminal Np and positive-side intermediate node Npd and switches between conduction and non-conduction between positive-side DC terminal Np and positive-side intermediate node Npd. Negative-side switch 52n is connected between negative-side DC terminal Nn and negative-side intermediate node Nnd and switches between conduction and non-conduction between negative-side DC terminal Nn and negative-side intermediate node Nnd.

Positive-side switch 52p and negative-side switch 52n (which are collectively denoted as a switch 52) may be a mechanical switch or a semiconductor switch. Positive-side connection arm 36a may be implemented by connection of a plurality of switches 52p in series or in parallel and negative-side connection arm 36b may be implemented by connection of a plurality of switches 52n in series or in parallel.

FIG. 23 is a flowchart showing an exemplary control operation by the power conversion device in FIG. 22. Referring to FIGS. 22 and 23, when no accident is occurring in the power system, control device 5 carries out normal control as in FIG. 10 (step S400). In this case, control device 5 controls switch 52 (52p and 52n) to open (turn off).

Then, when control device 5 detects a short-circuiting accident on the side of DC circuit 4 (for example, when an absolute value of arm current Ipu, Ipv, Ipw, Inu, Inv, or Inw exceeds a threshold value or a total value of arm currents of the phases exceeds a threshold value) (YES in step S410), control device 5 controls semiconductor switching elements 22a, 22b, 22c, and 22d of all converter cells 21H and 21F constituting each arm circuit 6 to open (turn off) and controls switch 52 (52p and 52n) to close (turn on) (step S420).

According to power conversion device 104 in the fifth embodiment as well, as in the first embodiment, the number of diode elements necessary for bypass circuit 30 as a protective circuit can be reduced. By including at least one full-bridge or hybrid converter cell 21F or 21HYB in each arm circuit 6 constituting conversion circuit 1, a path of DC short-circuiting current SCC can completely be switched from conversion circuit 1 to bypass circuit 30 in the event of a short-circuiting failure of DC circuit 4.

It should be understood that the embodiments disclosed herein are illustrative and non-restrictive in every respect. The scope of this invention is defined by the terms of the claims rather than the description above and is intended to include any modifications within the scope and meaning equivalent to the terms of the claims.

REFERENCE SIGNS LIST 1 conversion circuit; 2 AC circuit; 3 interconnected transformer; 4 DC circuit; 5 control device; 6 arm circuit; 6a positive-side arm circuit; 6b negative-side arm circuit; 7a, 7b reactor; 12 leg circuit; 21 converter cell; 21F full-bridge cell; 21H half-bridge cell; 22a, 22b, 22c, 22d semiconductor switching element; 23a, 23b, 23c, 23d diode; 24 DC capacitor; 26n, 26p input and output terminal; 27 switch; 28F, 28H, 28HYB bridge circuit; 29n, 52n negative-side switch; 29p, 52p positive-side switch; 30 bypass circuit; 31au, 31av, 31aw positive-side arm; 31bu, 31bv, 31bw negative-side arm; 32 diode element; 33, 35 resistive element; 36a positive-side connection arm; 36b negative-side connection arm; 37 full-wave rectification circuit; 38 non-linear element; 43 thyristor; 45 mechanical switch; 46 discharge gap; 47 controller; 55 starting circuit; 80 three-phase transformer; 101, 103, 104 power conversion device; Nn, Nn2 negative-side DC terminal; Nnd, Npd intermediate node; Np, Np2 positive-side DC terminal; Nu, Nv, Nw AC terminal

The invention claimed is:

1. A power conversion device to convert power between an AC circuit and a DC circuit, the power conversion device comprising:
   a plurality of positive-side arm circuits connected between a plurality of AC connections connected to the AC circuit and a positive-side DC terminal connected to the DC circuit;
   a plurality of negative-side arm circuits connected between the plurality of AC connections and a negative-side DC terminal connected to the DC circuit; and
   a bypass circuit,
   each of the positive-side arm circuits and each of the negative-side arm circuits each including a plurality of converter cells connected in series,
   each of the converter cells including:
      an energy storage; and
      a bridge circuit to switch connection between the energy storage and outside, the bypass circuit including:
   a full-wave rectification circuit connected between the plurality of AC connections, a positive-side intermediate node, and a negative-side intermediate node to convert AC voltages generated at the plurality of AC connections into a DC voltage across the positive-side intermediate node and the negative-side intermediate node and output the DC voltage;
   a positive-side connection arm connected between the positive-side intermediate node and the positive-side DC terminal, the positive-side connection arm blocking a current in a direction from the positive-side DC terminal toward the positive-side intermediate node; and
   a negative-side connection arm connected between the negative-side intermediate node and the negative-side DC terminal, the negative-side connection arm blocking a current in a direction from the negative-side intermediate node toward the negative-side DC terminal.

2. The power conversion device according to claim 1, wherein
   each arm constituting the full-wave rectification circuit includes a plurality of diode elements connected in series such that a direction from the negative-side intermediate node toward the positive-side intermediate node is defined as a forward direction,
   the positive-side connection arm includes a plurality of diode elements connected in series such that a direction from the positive-side intermediate node toward the positive-side DC terminal is defined as the forward direction, and the negative-side connection arm includes a plurality of diode elements connected in series such that a direction from the negative-side DC terminal toward the negative-side intermediate node is defined as the forward direction.

3. The power conversion device according to claim 2, wherein
each of the positive-side connection arm and the negative-side connection arm further includes a switching element connected in series to the plurality of diode elements.

4. The power conversion device according to claim 3, wherein
the switching element has such a non-linear current and voltage characteristic that when a voltage not lower than a first threshold value is applied, a current flows through the switching element and a voltage across terminals is lowered.

5. The power conversion device according to claim 4, wherein
each of the positive-side connection arm and the negative-side connection arm further includes a non-linear element connected in parallel to the switching element,
the non-linear element has such a non-linear current and voltage characteristic that when a voltage not lower than a second threshold value is applied, a current flows through the non-linear element and a voltage across terminals is lowered, and
the second threshold value is smaller than the first threshold value.

6. The power conversion device according to claim 3, wherein
each of the positive-side connection arm and the negative-side connection arm further includes a first resistive element connected in parallel to the switching element.

7. The power conversion device according to claim 2, wherein
each diode element included in arms constituting the full-wave rectification circuit, the positive-side connection arm, and the negative-side connection arm is an avalanche diode.

8. The power conversion device according to claim 2, wherein
each of arms constituting the full-wave rectification circuit, the positive-side connection arm, and the negative-side connection arm further includes a plurality of second resistive elements connected in parallel to the plurality of diode elements.

9. The power conversion device according to claim 3, wherein
the power conversion device has a first operation mode and a second operation mode,
in the first operation mode, the switching element is controlled to turn off,
in the second operation mode, the switching element is controlled to turn on, and
when a short-circuiting failure of the DC circuit is detected, the operation mode of the power conversion device is switched from the first operation mode to the second operation mode.

10. The power conversion device according to claim 1, wherein
the bridge circuit included in each of the converter cells is of a half-bridge configuration.

11. The power conversion device according to claim 10, wherein
the positive-side connection arm of the bypass circuit is connected to a second positive-side DC terminal provided on a DC line between the positive-side DC terminal and the DC circuit,
the negative-side connection arm of the bypass circuit is connected to a second negative-side DC terminal provided on a DC line between the negative-side DC terminal and the DC circuit, and
the power conversion device further comprises:
a positive-side switch connected between the positive-side DC terminal and the second positive-side DC terminal, the positive-side switch being capable of switching between conduction and non-conduction between the positive-side DC terminal and the second positive-side DC terminal; and
a negative-side switch connected between the negative-side DC terminal and the second negative-side DC terminal, the negative-side switch being capable of switching between conduction and non-conduction between the negative-side DC terminal and the second negative-side DC terminal.

12. The power conversion device according to claim 11, wherein
the power conversion device has a first operation mode and a second operation mode,
in the first operation mode, the positive-side switch and the negative-side switch are controlled to turn on,
in the second operation mode, the positive-side switch and the negative-side switch are controlled to turn off, and
when a short-circuiting failure of the DC circuit is detected, the operation mode of the power conversion device is switched from the first operation mode to the second operation mode.

13. The power conversion device according to claim 1, wherein
each of the positive-side arm circuits and each of the negative-side arm circuits each include at least one first converter cell including a full-bridge or hybrid bridge circuit and at least one second converter cell including a half-bridge bridge circuit.

14. The power conversion device according to claim 13, wherein
the energy storage is a capacitor, and
the capacitor provided in each first converter cell is higher in capacity than the capacitor provided in each second converter cell.

15. The power conversion device according to claim 13, wherein
each first converter cell includes a starting circuit,
the starting circuit is a low-voltage circuit started up by a charging voltage of the energy storage, and
after the starting circuit is started, the starting circuit controls any one semiconductor switching element constituting the bridge circuit to turn on and controls a remaining semiconductor switching element to turn off.

16. The power conversion device according to claim 15, wherein
when the charging voltage of the energy storage reaches a defined voltage, the starting circuit turns on two semiconductor switching elements provided on two arms connected to an identical terminal of the energy storage.

17. The power conversion device according to claim 13, wherein
    each first converter cell includes a starting circuit,
    the starting circuit is a low-voltage circuit started up by a charging voltage of the energy storage, and
    after the starting circuit is started, the starting circuit alternately repeats a first control state and a second control state each for a certain time period,
    in the first control state, any one semiconductor switching element constituting the bridge circuit is controlled to turn on, and
    in the second control state, two semiconductor switching elements provided on two arms connected to an identical terminal of the energy storage among four arms constituting the bridge circuit are controlled to turn on.

18. The power conversion device according to claim 13, wherein
    each first converter cell includes a normally closed switch connected in parallel to any one semiconductor switching element constituting a full bridge or a hybrid bridge.

19. A power conversion device to convert power between an AC circuit and a DC circuit, the power conversion device comprising:
    a plurality of positive-side arm circuits connected between a plurality of AC connections connected to the AC circuit and a positive-side DC terminal connected to the DC circuit;
    a plurality of negative-side arm circuits connected between the plurality of AC connections and a negative-side DC terminal connected to the DC circuit; and
    a bypass circuit,
    each of the positive-side arm circuits and each of the negative-side arm circuits each including a plurality of converter cells connected in series,
    each of the converter cells including:
        an energy storage; and
        a bridge circuit to switch connection between the energy storage and outside, the bypass circuit including;
    a full-wave rectification circuit connected between the plurality of AC connections, a positive-side intermediate node, and a negative-side intermediate node to convert AC voltages generated at the plurality of AC connections into a DC voltage across the positive-side intermediate node and the negative-side intermediate node and output the DC voltage;
    a positive-side switch connected between the positive-side intermediate node and the positive-side DC terminal, the positive-side switch being capable of switching between conduction and non-conduction between the positive-side intermediate node and the positive-side DC terminal; and
    a negative-side switch connected between the negative-side intermediate node and the negative-side DC terminal, the negative-side switch being capable of switching between conduction and non-conduction between the negative-side DC terminal and the negative-side intermediate node.

20. The power conversion device according to claim 19, wherein
    the power conversion device has a first operation mode and a second operation mode,
    in the first operation mode, the positive-side switch and the negative-side switch are controlled to turn off,
    in the second operation mode, the positive-side switch and the negative-side switch are controlled to turn on, and
    when a short-circuiting failure of the DC circuit is detected, the operation mode of the power conversion device is switched from the first operation mode to the second operation mode.

* * * * *